(12) United States Patent
Zhang et al.

(10) Patent No.: US 12,536,370 B2
(45) Date of Patent: **\*Jan. 27, 2026**

(54) ARBITRARY SIZE CONTENT ITEM GENERATION

(71) Applicant: GOOGLE LLC, Mountain View, CA (US)

(72) Inventors: Guannan Zhang, Shanghai (CN); Zuo Yan, Seattle, WA (US)

(73) Assignee: GOOGLE LLC, Mountain View, CA (US)

( \* ) Notice: Subject to any disclaimer, the term of this patent is extended or adjusted under 35 U.S.C. 154(b) by 16 days.

This patent is subject to a terminal disclaimer.

(21) Appl. No.: 18/196,746

(22) Filed: May 12, 2023

(65) Prior Publication Data

US 2023/0281383 A1  Sep. 7, 2023

Related U.S. Application Data

(63) Continuation of application No. 14/585,685, filed on Dec. 30, 2014, now Pat. No. 11,687,707, which is a
(Continued)

(51) Int. Cl.
*G06F 7/24* (2006.01)
*G06F 40/186* (2020.01)
*G06F 40/205* (2020.01)

(52) U.S. Cl.
CPC .............. *G06F 40/186* (2020.01); *G06F 7/24* (2013.01); *G06F 40/205* (2020.01)

(58) Field of Classification Search
None
See application file for complete search history.

(56) References Cited

U.S. PATENT DOCUMENTS

| 9,135,292 | B1* | 9/2015 | Tsun | G06F 16/9577 |
| 2002/0078096 | A1* | 6/2002 | Milton | G06F 16/345 |
| | | | | 715/252 |

(Continued)

FOREIGN PATENT DOCUMENTS

| CN | 1912825 A | 2/2007 |
| CN | 101976261 A | 2/2011 |
| WO | WO-2012/057726 A1 | 5/2012 |

OTHER PUBLICATIONS

Extended European Search Report on EP14881880.0 dated Sep. 22, 2017.
(Continued)

*Primary Examiner* — Loan T Nguyen
(74) *Attorney, Agent, or Firm* — MARSHALL, GERSTEIN & BORUN LLP

(57) ABSTRACT

A system for automatically generating a content item may include receiving a content item template having a set of elements for creating a content item and content item data for the set of elements. A placeholder for each element of the set of elements may be generated and a space allocation for each element may be selected based on the generated placeholders for each element. A determination if a conflict exists based on the determined space allocations for each element may be made and, when a conflict exists, an element from the set of elements may be eliminated and a new reduced set of elements may be returned. Responsive to determining no conflict exists, a content item may be generated using the content item data for the reduced set of elements and the determined space allocations.

24 Claims, 10 Drawing Sheets

Related U.S. Application Data continuation of application No. PCT/CN2014/071880, filed on Feb. 7, 2014.

(56) References Cited

U.S. PATENT DOCUMENTS

| | | | |
|---|---|---|---|
| 2003/0040926 A1* | 2/2003 | Milton | G06Q 10/043 |
| | | | 705/1.1 |
| 2006/0155699 A1* | 7/2006 | Purvis | G06Q 10/10 |
| 2007/0038929 A1 | 2/2007 | Miyazawa | |
| 2007/0079236 A1 | 4/2007 | Schrier et al. | |
| 2007/0166887 A1* | 7/2007 | Chen | G06F 30/39 |
| | | | 438/129 |
| 2008/0120536 A1 | 5/2008 | Osaka | |
| 2008/0147553 A1 | 6/2008 | Orner et al. | |
| 2008/0187241 A1* | 8/2008 | Talati | G06V 10/25 |
| | | | 382/282 |
| 2008/0250052 A1 | 10/2008 | Jones et al. | |
| 2009/0113282 A1* | 4/2009 | Schultz | G06F 16/9566 |
| | | | 715/208 |
| 2009/0254572 A1 | 10/2009 | Redlich et al. | |
| 2010/0110495 A1* | 5/2010 | Letocha | G06F 3/1215 |
| | | | 358/1.17 |
| 2010/0115400 A1* | 5/2010 | Yamanakajima | G06F 40/186 |
| | | | 715/243 |
| 2013/0086031 A1* | 4/2013 | Marantz | G06F 16/9535 |
| | | | 707/706 |
| 2013/0132209 A1 | 5/2013 | Belwadi | |
| 2014/0089124 A1 | 3/2014 | Jha et al. | |
| 2014/0164352 A1* | 6/2014 | Denninghoff | G06F 16/953 |
| | | | 707/711 |
| 2015/0100606 A1 | 4/2015 | Bonner | |
| 2018/0107641 A1* | 4/2018 | Choi | G06F 40/186 |

OTHER PUBLICATIONS

First Office Action for CN Application No. 201480077640.0 dated Aug. 28, 2018.
Second Office Action for CN Appln. Ser. No 201480077640.0 dated Mar. 6, 2019.
International Search Report and Written Opinion of PCT/CN2014/071880, mailed Nov. 15, 2014.

* cited by examiner

ARBITRARY SIZE CONTENT ITEM GENERATION

CROSS-REFERENCE TO RELATED PATENT APPLICATIONS

This application is a continuation of U.S. patent application Ser. No. 14/585,685, filed Dec. 30, 2014, which is a continuation of International Application No. PCT/CN2014/071880, filed Feb. 7, 2014. The entire disclosure of each of the above-identified applications is hereby incorporated herein by reference.

BACKGROUND

In a networked environment, such as the Internet or other networks, first-party content providers can provide information for public presentation on resources, for instance webpages, documents, applications, and/or other resources. The first-party content can include text, video, and/or audio information provided by the first-party content providers via, for instance, a resource server for presentation on a client device over the Internet. The first-party content may be a webpage requested by the client device or a stand-alone application (e.g., a video game, a chat program, etc.) running on the client device. Additional third-party content can also be provided by third-party content providers for presentation on the client device together with the first-party content provided by the first-party content providers. For instance, the third-party content may be a public service announcement or advertisement that appears in conjunction with a requested resource, such as a webpage (e.g., a search result webpage from a search engine, a webpage that includes an online article, a webpage of a social networking service, etc.) or with an application (e.g., an advertisement within a game). Thus, a person viewing a resource can access the first-party content that is the subject of the resource as well as the third-party content that may or may not be related to the subject matter of the resource.

SUMMARY

Implementations described herein relate to systems and methods to generate arbitrary sized content items automatically using a given URL and width and height constraints.

One implementation relates to a system for automatically generating a content item. The system may include one or more processors and one or more storage devices. The one or more storage devices includes instructions that cause the one or more processors to perform several operations. The operations include receiving a content item template having a set of elements for creating a content item and content item data for the set of elements. The operations also include generating a placeholder for each element of the set of elements of the content item template and selecting a space allocation for each element of the set of elements based, at least in part, on the generated placeholders. The operations further include determining whether a conflict exists based on the determined space allocations for each element of the set of elements. When a conflict exists, the operations further include eliminating an element from the set of elements and returning a new reduced set of elements to generate the placeholders based on the new set of elements. Responsive to determining no conflict exists, the operations include generating a content item using the content item data for the reduced set of elements and the determined space allocations.

Another implementation relates to a method for automatically generating a content item. The method includes receiving a landing page URL, a first dimensional value, and a second dimensional value. The method further includes receiving a content item template having a set of elements for creating a content item. The method also includes generating a placeholder for each element of the set of elements of the content item template based, at least in part, on the first dimensional value and the second dimensional value. The method still further includes selecting a space allocation for each element of the set of elements based, at least in part, on the generated placeholders for each element of the set of elements. The method yet further includes determining whether a conflict exists based on the determined space allocations for each element of the set of elements. When a conflict exists, the method includes eliminating an element from the set of elements and returning a new reduced set of elements to generate the placeholders based on the new reduced set of elements. Responsive to determining no conflict exists, the method includes generating a content item using the determined space allocations and content item data of a landing page resource associated with the landing page URL. The method includes determining a score for the generated content item based, at least in part, on the determined space allocations.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
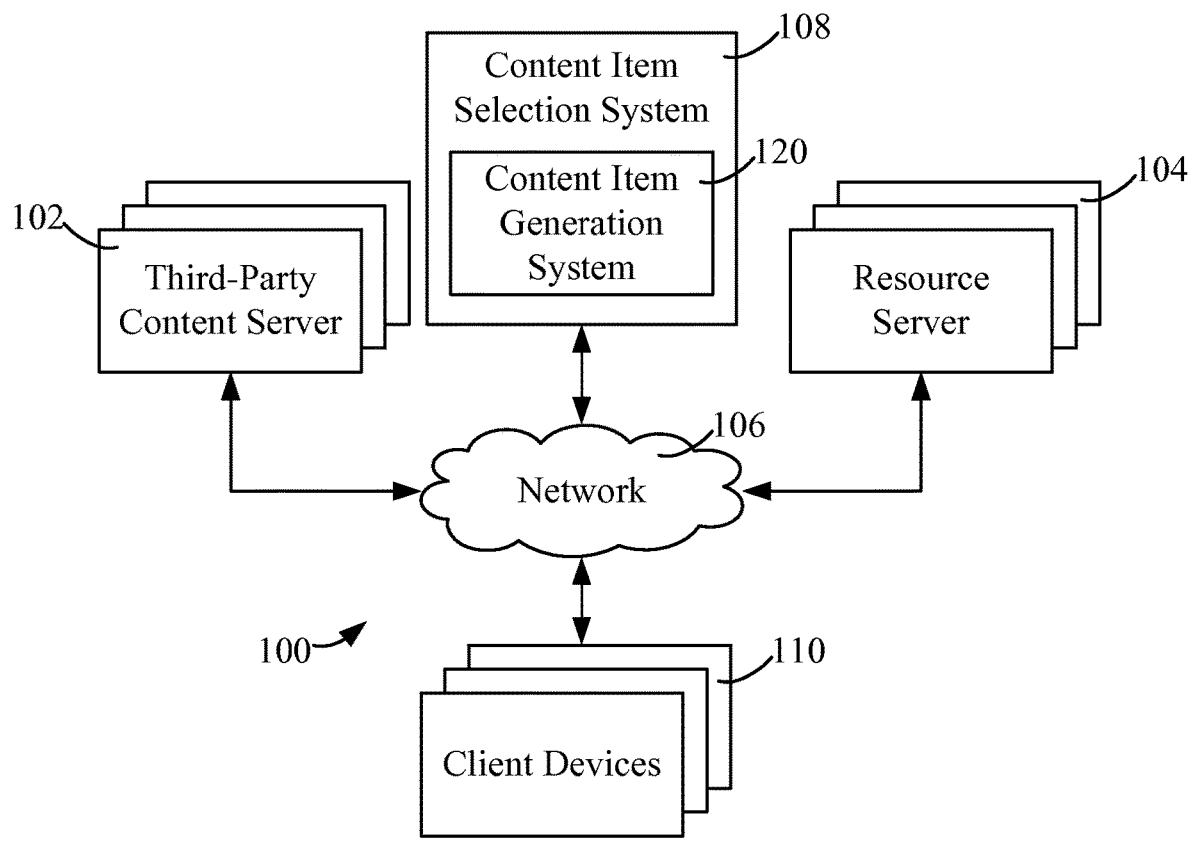
FIG. 1 is an overview depicting an implementation of a system of providing information via a computer network.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways as the described concepts are not limited to any particular manner of implementation. Specific implementations and applications are provided primarily for illustrative purposes.

A computing device (e.g., a client device) can view a resource, such as a webpage, a document, an application, etc. In some implementations, the computing device may access the resource via the Internet by communicating with a server, such as a webpage server, corresponding to that resource. The resource includes first-party content that is the subject of the resource from a first-party content provider and may also include additional third-party provided content, such as advertisements or other content. In one implementation, responsive to receiving a request to access a webpage, a webpage server and/or a client device can communicate with a data processing system, such as a content item selection system, to request a content item to be presented with the requested webpage, such as through the execution of code of the resource to request a third-party content item to be presented with the resource. The content item selection system can select a third-party content item and provide data to effect presentation of the content item with the requested webpage on a display of the client device. In some instances, the content item is selected and served with a resource associated with a search query response. For instance, a search engine may return search results on a search results webpage and may include third-party content items related to the search query in one or more content item slots of the search results webpage.

The computing device (e.g., a client device) may also be used to view or execute an application, such as a mobile application. The application may include first-party content that is the subject of the application from a first-party content provider and may also include additional third-party provided content, such as advertisements or other content. In one implementation, responsive to use of the application, a resource server and/or a client device can communicate with a data processing system, such as a content item selection system, to request a content item to be presented with a user interface of the application and/or otherwise. The content item selection system can select a third-party content item and provide data to effect presentation of the content item with the application on a display of the client device.

In some instances, a device identifier may be associated with the client device. The device identifier may be a randomized number associated with the client device to identify the device during subsequent requests for resources and/or content items. In some instances, the device identifier may be configured to store and/or cause the client device to transmit information related to the client device to the content item selection system and/or resource server (e.g., values of sensor data, a web browser type, an operating system, historical resource requests, historical content item requests, etc.).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For instance, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A third-party content provider, when providing third-party content items for presentation with requested resources via the Internet or other network, may utilize a content item management service to control or otherwise influence the selection and serving of the third-party content items. For instance, a third-party content provider may specify selection criteria (such as keywords) and corresponding bid values that are used in the selection of the third-party content items. The bid values may be utilized by the content item selection system in an auction to select and serve content items for presentation with a resource. For instance, a third-party content provider may place a bid in the auction that corresponds to an agreement to pay a certain amount of money if a user interacts with the provider's content item (e.g., the provider agrees to pay $3 if a user clicks on the provider's content item). In other instances, a third-party content provider may place a bid in the auction that corresponds to an agreement to pay a certain amount of money if the content item is selected and served (e.g., the provider agrees to pay $0.005 each time a content item is selected and served or the provider agrees to pay $0.05 each time a content item is selected or clicked). In some instances, the content item selection system uses content item interaction data to determine the performance of the third-party content provider's content items. For instance, users may be more inclined to click on third-party content items on certain webpages over others. Accordingly, auction bids to place the third-party content items may be higher for high-performing webpages, categories of webpages, and/or other criteria, while the bids may be lower for low-performing webpages, categories of webpages, and/or other criteria.

In some instances, one or more performance metrics for the third-party content items may be determined and indications of such performance metrics may be provided to the third-party content provider via a user interface for the content item management account. For instance, the performance metrics may include a cost per impression (CPI) or cost per thousand impressions (CPM), where an impression may be counted, for instance, whenever a content item is selected to be served for presentation with a resource. In some instances, the performance metric may include a click-through rate (CTR), defined as the number of clicks on the content item divided by the number of impressions. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), and/or other performance metrics may be used.

In some instances, a webpage or other resource (such as, for instance, an application) includes one or more content item slots in which a selected and served third-party content item may be displayed. The code (e.g., JavaScript®, HTML, etc.) defining a content item slot for a webpage or other resource may include instructions to request a third-party content item from the content item selection system to be presented with the webpage. In some implementations, the code may include an image request having a content item request URL that may include one or more parameters (e.g., /page/contentitem?devid=abc123&devnfo=A34r0). Such parameters may, in some implementations, be encoded strings such as "devid=abc123" and/or "devnfo=A34r0."

The selection of a third-party content item to be served with the resource by a content item selection system may be based on several influencing factors, such as a predicted click through rate (pCTR), a predicted conversion rate (pCVR), a bid associated with the content item, etc. Such influencing factors may be used to generate a value, such as a score, against which other scores for other content items may be compared by the content item selection system through an auction.

During an auction for a content item slot for a resource, such as a webpage, several different types of bid values may be utilized by third-party content providers for various third-party content items. For instance, an auction may include bids based on whether a user clicks on the third-party content item, whether a user performs a specific action based on the presentation of the third-party content item, whether the third-party content item is selected and served, and/or other types of bids. For instance, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid and/or adjusted for other reasons. For instance, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score or an normalized value, may be generated to be used in the auction based on the bid value and the probability or another modifying value. The value or score for a bid based on whether the third-party content item is selected and served may be $0.005*1.00=0.005 and the value or score for a bid based on whether a user performs a specific action may be $5*0.002=0.01. To maximize the income generated, the content item selection system may select the third-party content item with the highest value from the auction. In some implementations, the content item selection system may select the content item associated with the bid based on whether the user performs the specific action due to the higher value or score associated with that bid.

Once a third-party content item is selected by the content item selection system, data to effect presentation of the third-party content item on a display of the client device may be provided to the client device using a network.

In some instances, it may be useful to automatically generate content items for a third-party content provider using a landing page uniform resource locator (URL), a first dimensional value, and a second dimensional value. That is, given a landing page of a third-party content provider and the dimensions for a content item slot, a content item, such as an advertisement, may be automatically generated based on one or more content item templates using the dimensions and content item data determined from the landing page URL. In some implementations, the content item may be generated on-demand, such as responsive to a request for a content item, or the content item may be generated and data for the content item may be stored in a database or presented in a user interface to a third-party content provider generating content items.

The landing page URL, first dimensional value, and/or second dimensional value may be received from a client device, a first-party content provider, or a third-party content provider. In some instances, the first dimensional value and second dimensional value may be received from a client device in response to the client device requesting a resource of the first-party content provider having a content item slot. The client device may receive data for the first-party resource and transmit a request for a content item, such as an advertisement, including the first dimensional value and second dimensional value to a content item selection system. The content item selection system may select a third-party content provider and a content item generation system may generate a content item using a landing page URL of the third-party content provider, the first dimensional value, and the second dimensional value. The content item selection system may then output data to display the generated content item with the resource of the first-party content provider. In other implementations, the first dimensional value and second dimensional value may be received from the first-party content provider in response to a client device requesting a resource of the first-party content provider having a content item slot.

In some implementations, the landing page URL, first dimensional value, and second dimensional value may be received from a third-party content provider independent of a client device requesting a resource. For instance, a third-party content provider may utilize a content item generation system to generate content items of different sizes to be stored in a database and served responsive to subsequent content item requests from a client devices or first-party content providers.

The content item data determined from the landing page URL may be determined using a resource renderer capable of interpreting a resource associated with the landing page URL and creating a visual representation (e.g., an image, a display, etc.) thereof. For instance, the resource of the landing page URL may include marked-up content (e.g., HTML, XML, image URLs, etc.) as well as formatting information (e.g., CSS, XSL, etc.). The resource renderer may download the marked-up content and formatting information and render the resource associated with the landing page URL according to World Wide Web Consortium (W3C) standards. The resource renderer may thus create a "snapshot image" of the resource associated with the landing page URL and/or construct a document object model (DOM) tree representing the various components of the resource associated with the landing page URL.

In some implementations, the content item data may include image data, color data, text data, logo data, etc. In some implementations, an image module may parse the DOM tree of the resource associated with the landing page URL to identify and extract images and image metadata (e.g., image URL, display position, display size, alt text, etc.) for the image data. In some instances, a color module may use the snapshot image and/or DOM tree of the resource associated with the landing page URL to select colors for color data for the content item to be generated. A text module may be configured to automatically generate textual data for the content item (e.g., a textual description, a headline, etc.), such as by using the DOM tree or snapshot image of the resource associated with the landing page URL to create a summary of the text displayed on the resource associated with the landing page URL. In still further instances, logo data for one or more logos may be extracted using the DOM tree or snapshot image of the resource associated with the landing page URL. A logo image may be a trademark, a business logo, a product logo, a company logo, or any other image associated with a particular product, service, or organization. In some implementations, the content item data, such as image data, color data, text data, logo data, etc., may be retrieved from a database or received from a third-party content provider for the generated content item.

The one or more content item templates may be stored in a content item template database and retrieved responsive to a request for one or more content item templates from a content item generation system. The content item templates define the elements and arrangement of elements for a content item to be generated from the content item template. In some implementations, the one or more content item templates may be a constrained XML configuration file that defines one or more elements of the content item template. Each content item template includes at least one element that is a required element for the content item template. Furthermore, each element of the content item template includes an index value, an element name, and at least two anchors defining the arrangement of the element relative to another element and/or relative to the content item itself (e.g., a button element may be defined by a right anchor relative to a right edge of the content item and a bottom anchor relative to a bottom edge of the content item). The index value for each element may be used to prioritize elements of the content item template.

An anchor is used to describe a relationship between two elements of the content item template or between an element and the content item to be generated from the content item template. An anchor is defined by a reference (e.g., another element or the content item itself), a distance (e.g., a fixed distance such as pixels (px) or a relative distance such as 10%), a type (e.g., top, bottom, left, or right), and a flexibility indicator (i.e., whether the position of the anchor is variable or fixed).

Using one or more content item templates and the content item data, a content item generation system may generate and score content items for each content item template for a given set of dimensions, such as the first dimensional value and the second dimensional value, to maximize space utilization. The content item generation system may parse a layout configuration file of a content item template to determine layout element data for one or more elements of the content item template. The content item generation system may then determine a placeholder for each element of the one or more elements based on the anchors of the layout element data, the dimensional values for the content item to be generated, and the content item data. The content item generation system may utilize one or more element renderers to determine an initial space allocation for each element of the one or more elements based on the placeholder and whether one or more of the anchors are flexible (i.e., permits a portion of the space allocation to vary in size). In some instances, the initial space allocation may be the same as the placeholder (e.g., if an element is defined by only fixed anchors, then the initial space allocation may be the same as the placeholder).

The content item generation system may determine a final space allocation for each element of the one or more elements based on the initial space allocation and modifying any elements with flexible anchors by using a growth function to expand the initial space allocation to maximize the space utilization of the content item. The content item generation system may then determine if any conflicts exist for the content item based on the determined final space allocations. Such conflicts may include overlap of elements, overflow of an element beyond the dimensions of the content item, insufficient margin, text truncation, and/or other content item template-specific conflicts.

If a conflict exists, the content item generation system may eliminate an element from the one or more elements of the content item template and return to determine the placeholders based on the reduced set of elements. The element that is removed from the one or more elements may be based on the index values of the elements (e.g., removing the element with the highest index value indicative of the element being lower in importance to the content item template). In some implementations, the element determined to be removed may be indicated as a required element based on the layout element data. In such an instance, the content item generation system may select a new content item template, parse the template, and proceed to generate a content item using the new template. In other instances, the content item generation system may halt generation of the content item and output an error (e.g., if no other content item templates may be used).

If no conflict exists, then the content item generation system may determine a score for the content item, in some implementations. The score for the content item may be based on the number of elements in the generated content item compared to the number of elements of the content item template, the number of unused pixels, an average number of unused pixels per vertical or horizontal line, weightings for one or more elements, etc. In some implementations, the content item generation system may generate several content items, each having an associated score, and the content item generation system may rank the scores and select the highest-scoring generated content item. In some implementations, data to display the selected highest-scoring generated content item may be outputted to a client device to display the generated content item with a first-party content provider resource.

In other implementations, data to display the highest-scoring generated content item may be stored in a database to be output at a later time. In still further implementations, all or a subset of the generated content items and the associated scores may be stored in a database. In still other implementations, data for all a subset of the generated content items and the associated scores may be output to a user interface of a computing device of the third-party content provider for selection. For instance, the content item generation system may be integrated into a content item generation user interface for a third-party content provider. Responsive to input of a landing page URL and dimensions for a desired content item from the third-party content provider, the content item generation system may output a set of generated content items and associated scores such that the third-party content item provider may select a generated content item, even if the generated content item does not have the highest score.

While the foregoing has provided an overview of automatically generating a content item using arbitrary dimensions, the following provides more details regarding various implementations.

FIG. 1 is a block diagram of an implementation of a system 100 for providing information via at least one computer network such as the network 106. The network 106 may include a local area network (LAN), wide area network (WAN), a telephone network, such as the Public Switched Telephone Network (PSTN), a wireless link, an intranet, the Internet, or combinations thereof. The system 100 can also include at least one data processing system, such as a content item selection system 108. The content item selection system 108 can include at least one logic device, such as a computing device having a data processor, to communicate via the network 106, for instance with a resource server 104, a client device 110, and/or a third-party content server 102. The content item selection system 108 can include one or more data processors, such as a content placement processor, configured to execute instructions stored in a memory device to perform one or more operations described herein. In other words, the one or more data processors and the memory device of the content item selection system 108 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor may process instructions and output data to effect presentation of one or more content items to the resource server 104 and/or the client device 110. In addition to the processing circuit, the content item selection system 108 may include one or more databases configured to store data. The content item selection system 108 may also include an interface configured to receive data via the network 106 and to provide data from the content item selection system 108 to any of the other devices on the network 106. The content item selection system 108 can include a server, such as an advertisement server or otherwise.

The content item selection system 108 may include a content item generation system 120. In some implementations, the content item generation system 120 may part of the same system as the content item selection system 108 or the content item generation system 120 may be separate from the content item selection system 108. For instance, the content item generation system 120 may be a sub-system of the content item selection system 108 or the content item generation system 120 may be a separate system in communication with the content item selection system 108. In implementations where the content item generation system 120 is separate from the content item selection system 108, the content item generation system 120 may be constructed in a similar manner to the content item selection system 108 described herein.

In still further implementations, the content item selection system 108 may be omitted and the content item generation system 120 may be connected to the network 106 to communicate with the third-party content server 102, resource server 104, and/or client device 110.

The client device 110 can include one or more devices such as a computer, laptop, desktop, smart phone, tablet, personal digital assistant, set-top box for a television set, a smart television, or server device configured to communicate with other devices via the network 106. The device may be any form of electronic device that includes a data processor and a memory. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The client device 110 can execute a software application (e.g., a web browser or other application) to retrieve content from other computing devices over network 106. Such an application may be configured to retrieve first-party content from a resource server 104. In some cases, an application running on the client device 110 may itself be first-party content (e.g., a game, a media player, etc.). In one implementation, the client device 110 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device executing the instructions from the web browser application may request data from another device connected to the network 106 referred to by the URL address (e.g., a resource server 104). The other device may then provide web page data and/or other data to the client device 110, which causes visual indicia to be displayed by the display of the client device 110. Accordingly, the browser window displays the retrieved first-party content, such as web pages from various websites, to facilitate user interaction with the first-party content.

The resource server 104 can include a computing device, such as a server, configured to host a resource, such as a web page or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. In one implementation, the client device 110 can access the resource server 104 via the network 106 to request data to effect presentation of a resource of the resource server 104.

One or more third-party content providers may have third-party content servers 102 to directly or indirectly provide data for third-party content items to the content item selection system 108 and/or to other computing devices via network 106. The content items may be in any format that may be presented on a display of a client device 110, for instance, graphical, text, image, audio, video, etc. The content items may also be a combination (hybrid) of the formats. The content items may be banner content items, interstitial content items, pop-up content items, rich media content items, hybrid content items, Flash® content items, cross-domain iframe content items, etc. The content items may also include embedded information such as hyperlinks, metadata, links, machine-executable instructions, annotations, etc. In some instances, the third-party content servers 102 may be integrated into the content item selection system 108 and/or the data for the third-party content items may be stored in a database of the content item selection system 108.

In an implementation, the content item selection system 108 can receive, via the network 106, a request for a content item to present with a resource. The received request may be received from a resource server 104, a client device 110, and/or any other computing device. The resource server 104 may be owned or ran by a first-party content provider that may include instructions for the content item selection system 108 to provide third-party content items with one or more resources of the first-party content provider on the resource server 104. In one implementation, the resource may include a web page.

The client device 110 may be a computing device operated by a user (represented by a device identifier), which, when accessing a resource of the resource server 104, can make a request to the content item selection system 108 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, etc.). The information that the content item selection system 108 receives can include a HyperText Transfer Protocol (HTTP) cookie which contains a device identifier (e.g., a random number) that represents the client device 110.

In some implementations, the device information and/or the resource information may be appended to a content item request URL (e.g., contentitem.item/page/contentitem?devid=abc123&devnfo=A34r0). In some implementations, the device information and/or the resource information may be encoded prior to being appended to the content item request URL. The requesting device information and/or the resource information may be utilized by the content item selection system 108 to select third-party content items and/or a third-party content provider for a content item to be served with the requested resource and presented on a display of a client device 110. As will be described in greater detail below, in some implementations, the content item generation system 120 may generate one or more content items responsive to the request for a content item.

In some instances, a resource of a resource server 104 may include a search engine feature. The search engine feature may receive a search query (e.g., a string of text) via an input feature (an input text box, etc.). The search engine may search an index of documents (e.g., other resources, such as web pages, etc.) for relevant search results based on the search query. The search results may be transmitted as a second resource to present the relevant search results, such as a search result web page, on a display of a client device 110. The search results may include web page titles, hyperlinks, etc. One or more third-party content items may also be presented with the search results in a content item slot of the search result web page. Accordingly, the resource server 104 and/or the client device 110 may request one or more content items from the content item selection system 108 to be presented in the content item slot of the search result web page. The content item request may include additional information, such as the user device information, the resource information, a quantity of content items, a format for the content items, the search query string, keywords of the search query string, information related to the query (e.g., geographic location information and/or temporal information), etc. In some implementations, a delineation may be made between the search results and the third-party content items to avert confusion.

In another implementation, the content item generation system 120 may be utilized to generate one or more content items independent of a request for a content item (e.g., to pre-generate one or more content items). The content item generation system 120 may generate the one or more content items responsive to a request from a third-party content provider, such as via the third-party content server 102 and/or a client device 110 of the third-party content provider. In some implementations, the one or more generated content items may be stored in a database to be selected and served responsive to a subsequent content item request. In some instances, the one or more generated content items may be presented in a user interface to the third-party content provider such that the third-party content provider may select one or more of the generated content items to be saved and stored in a database.

While the foregoing has provided an overview of a system 100 for selecting and serving content items to client devices 110 and/or generating content items using a content item generation system 120, implementations for generating content items using arbitrary dimensional data will now be described in greater detail.

Figure 2:
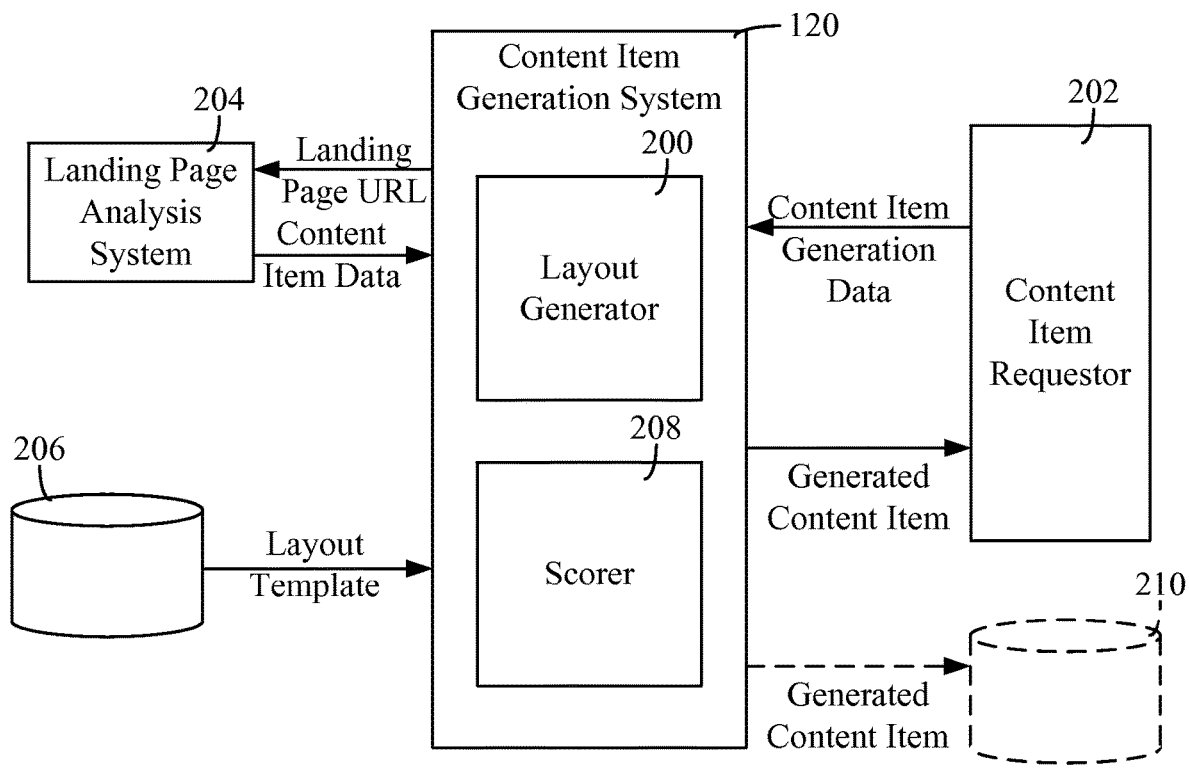
FIG. 2 is a block diagram depicting an implementation of a content item generation system in greater detail and having a layout generator and a scorer.

Referring to FIG. 2, the content item generation system 120 includes a layout generator 200 and a scorer 208. As will be described in greater detail in reference to FIGS. 3-11, the layout generator 200 is configured to receive content item generation data, one or more content item templates, and content item data to generate one or more content items. A scorer 208 is configured to generate a score for the generated one or more content items. In some implementations, the content item generation system 120 is configured to rank the generated one or more content items based on the score and select the highest-scoring generated content item. The content item generation system 120 may then transmit data to display the highest-scoring generated content item responsive to the content item generation data from the content item requestor 202. In other implementations, the content item generation system 120 may store data to display the highest-scoring generated content item in a content item database 210 (shown in phantom). In still further implementations, the content item generation system 120 may output data to display the generated one or more content items and the associated score. The data to display the generated one or more content items and the associated score may be presented in a user interface of the content item requestor 202 (or a device in communication therewith). In some implementations, a user of the device of the content item requestor 202 may select one or more of the generated content items using the user interface to be stored in a database, such as the content item database 210. The generated one or more content items may be HTML content items in some implementations.

The content item generation data may include a first dimensional value, a second dimensional value, and/or a landing page URL from a content item requestor 202. In some implementations, the content item requestor 202 may be the content item selection system 108 for generating a content item responsive to a content item request. In other implementations, the content item requestor 202 may be a third-party content provider generating a content item independent of a content item request.

The content item generation system may transmit the landing page URL to a landing page analysis system 204 for retrieving content item data for generating content items. The landing page analysis system 204 may include a resource renderer capable of interpreting a resource associated with the landing page URL and creating a visual representation (e.g., an image, a display, etc.) thereof. For instance, the resource of the landing page URL may include marked-up content (e.g., HTML, XML, image URLs, etc.) as well as formatting information (e.g., CSS, XSL, etc.). The resource renderer may download the marked-up content and formatting information and render the resource associated with the landing page URL according to World Wide Web Consortium (W3C) standards. The resource renderer may thus create a "snapshot image" of the resource associated with the landing page URL and/or construct a document object model (DOM) tree representing the various components of the resource associated with the landing page URL.

The snapshot image may be a visual representation of the resource associated with the landing page URL. The snapshot image may illustrate the visual appearance of the resource associated with the landing page URL as presented on a user interface of a client device (e.g., an electronic display screen, a computer monitor, a touch-sensitive display, etc.) after rendering the resource associated with the landing page URL. The snapshot image may include color information (e.g., pixel color, brightness, saturation, etc.) and style information (e.g., square corners, rounded edges, modern, rustic, etc.) for the resource associated with the landing page URL. In some implementations, the snapshot image may be a picture file having any viable file extension (e.g. .jpg, .png, .bmp, etc.).

The DOM tree may be a hierarchical model of the resource associated with the landing page URL. The DOM tree may include image information (e.g., image URLs, display positions, display sizes, alt text, etc.), font information (e.g., font names, sizes, effects, etc.), color information (e.g., RGB color values, hexadecimal color codes, etc.) and text information for the resource associated with the landing page URL. The landing page analysis system 204 may store the snapshot image and/or DOM tree in a memory for subsequent use.

In some implementations, the content item data may include image data, color data, text data, logo data, etc. In some implementations, an image module may parse the DOM tree of the resource associated with the landing page URL to identify and extract images and image metadata (e.g., image URL, display position, display size, alt text, etc.) for the image data. The image metadata may be used to determine an on-page saliency for each image displayed on the resource associated with the landing page URL. In some implementations, the image module extracts images and image metadata from other data sources (e.g., a repository of previously-used or approved images, a repository of stock images, etc.).

In some implementations, the image module may analyze the extracted images to detect the visual content of the images. Detecting visual content may include, for instance, determining a location of a salient object represented in the image, determining a location of text in the image, and/or determining whether the image can be cropped or processed to improve the visual impact of the image. In some implementations, the image module analyzes the extracted images to detect the semantic content of the images. Detecting semantic content may include, for instance, identifying an object depicted in an image or a meaning conveyed by an image. The image module may assign one or more labels or keywords to an image describing the semantic content thereof. The labels and/or keywords can be used to determine a relevancy of the image to a particular third-party content item.

The image module may process the images to prepare the images for use in a third-party content item. The image processing may include cropping the images to emphasize salient objects or to remove text, resizing the images, formatting the images, or otherwise adjusting the images.

The image module may filter and rank images based on various attributes of the images. The image module may determine a quality score and/or on-page salience score for each of the images. The quality score for an image may indicate an aesthetic appearance of the image based on various image attributes. The salience score may indicate a prominence with which an extracted image is displayed on the resource associated with the landing page URL. The image module may discard or filter images that have a display size less than a threshold display size or a quality score less than a threshold quality score. In some implementations, the image module of the landing page analysis system 204 ranks the images based on the salience scores associated with the images. The image module may select the top ranking image or images for inclusion in the content item data.

In some instances, a color module of the landing page analysis system 204 may use the snapshot image and/or DOM tree of the resource associated with the landing page URL to select colors for the content item data. For instance, the color module may select colors for the background, headline, description, button background, and/or button text of the content item. The color scheme may include one or more colors corresponding to the colors displayed on the resource associated with the landing page URL In some implementations, the color module may extracts several color clusters from the snapshot image using a clustering technique (e.g., k-means clustering).

A text module may be configured to automatically generate textual data for the content item (e.g., a textual description, a headline, etc.), such as by using the DOM tree or snapshot image of the resource associated with the landing page URL to create a summary of the text displayed on the resource associated with the landing page URL. In some implementations, the text module may retrieve textual data from other data sources in addition to or in lieu of the resource associated with the landing page URL. For instance, text module 216 may receive textual data from user-created reviews of a business, product, or service. The reviews may be retrieved from an Internet resource (e.g., website) on which users are permitted to post or submit comments, reviews, or other text related to a particular business, product, or service. In some implementations, the text module may identify and extract a snippet of a review that includes a positive phrase for inclusion in the content item data. In some implementations, the text module may identify a font of the text and include data indicative of the font in the content item data.

In still further instances, logo data for one or more logos may be extracted using the DOM tree or snapshot image of the resource associated with the landing page URL. A logo image may be a trademark, a business logo, a product logo, a company logo, or any other image associated with a particular product, service, or organization. In some implementations, the landing page analysis system 204 may query a databases to identify logo images based on the landing page URL and/or a domain name of the landing page URL such that logo information may be readily retrieved by specifying a URL.

In some implementations, such as when a third-party content provider is utilizing the content item generation system 120 to generate one or more content items independent of a content item request, the third-party content provider may transmit content item data to the content item generation system 120 such that the landing page analysis system 204 does not analyze a resource associated with the landing page URL to determine and retrieve content item data.

Still referring to FIG. 2, the content item generation system 120 receives one or more content item templates from a content item template database 206. The content item templates define the elements and arrangement of elements for a content item to be generated from the content item template. In some implementations, the one or more content item templates may be a constrained XML configuration file that defines one or more elements of the content item template. Each content item template includes at least one element that is a required element for the content item template. Furthermore, each element of the content item template includes an index value, an element name, and at least two anchors (at least one left or right anchor and at least one top or bottom anchor) defining the arrangement of the element relative to another element and/or relative to the content item itself (e.g., a button element may be defined by a right anchor relative to a right edge of the content item and a bottom anchor relative to a bottom edge of the content item). The index value for each element may be used to prioritize elements of the content item template. The content item templates and anchors will be described in greater detail in reference to FIGS. 5-7C.

In some implementations, the content item generation system 120 may retrieve all of the content item templates from the content item template database 206 as a set of content item templates. In other implementations, the content item generation system 120 may filter the content item templates of the content item template database 206 for a subset of content item templates.

In some implementations, the content item generation system 120 may use the first dimensional value and the second dimensional value to determine the set of content item templates to generate content items. For instance, if the first dimensional value is 580 pixels (i.e., 580 pixels in width) and the second dimensional value is 100 pixels (i.e., 100 pixels in height), then a content item template having vertically stacked image, text, logo, and button elements (such as shown in FIGS. 14C-14D) may not be suitable for such dimensions. Accordingly, the content item generation system 120 may exclude such a content item template from the set of content item templates retrieved from the content item template database 206. In some implementations, the content item templates may be annotated with one or more values indicative of a minimum and/or maximum aspect ratio for a generated content item from the content item template. The content item generation system 120 may determine a ratio of the first dimensional value to the second dimensional value and use the determined ratio to filter content item templates for which the determined ratio is below the minimum aspect ratio or above the maximum aspect ratio. Thus, content item templates which may be less useful for the first dimensional value and second dimensional value may be excluded.

In some implementations, the content item templates may be filtered based on the content item data in addition to or in lieu of the dimensional value filtering. For instance, if the content item data does not include text data, then the content item generation system 120 may retrieve only content item templates that do not include a text element. The content item templates may be annotated with one or more values indicative of the elements included in the content item template for such filtering.

Using the content item generation data, the set of one or more content item templates, and the content item data, the layout generator 200 generates one or more content items as described in greater detail herein.

Figure 3:
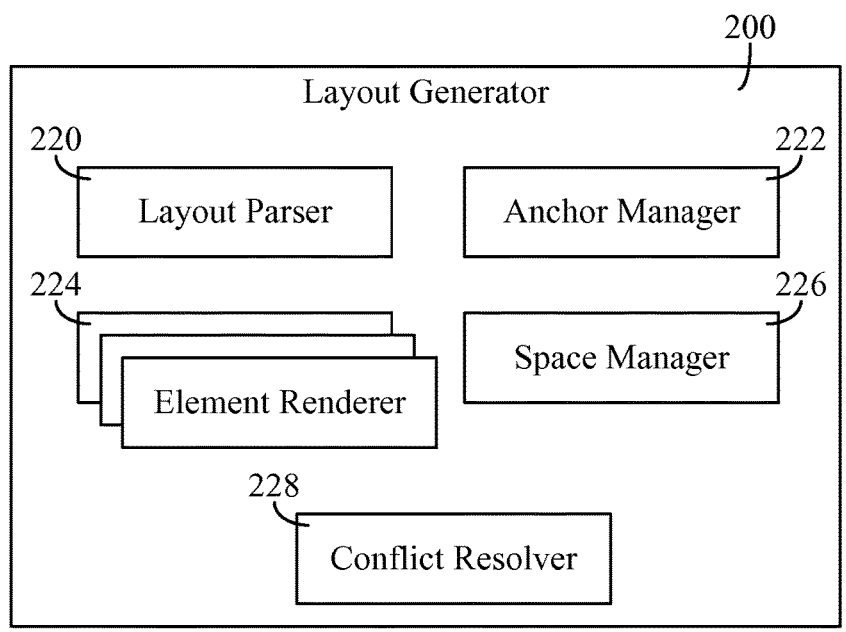
FIG. 3 is a block diagram depicting an implementation of the layout generator of FIG. 2 in greater detail having a layout parser, an anchor manager, one or more element renderers, a space manager, and a conflict resolver.

Referring to FIG. 3, the layout generator 200 includes a layout parser 220, an anchor manager 222, one or more element renderers 224, a space manager 226, and a conflict resolver 228. The layout parser 220 receives a content item template and parses the content item template into one or more layout elements and associated data for the one or more layout elements (e.g., anchor data, element name, index value, requirement indicator, etc.). The layout parser 220 will be described in greater detail in reference to FIG. 5.

The anchor manager 222 receives a set of one or more parsed layout elements and associated data and determines a placeholder for each of the set of one or more parsed layout elements based on the associated data for the one or more elements, the first dimensional value and second dimensional value, and the content item data. The placeholder is the maximum space that an element can occupy in the content item based on the anchors for the element, the dimensions of the content item to be generated, and the content item data to be used to populate the element. Because some elements may depend from other elements based on the anchors, the anchor manager 222 performs a topological sorting to determine an order in which to determine the placeholders for the one or more elements. That is, if an element, such as a logo element, includes an anchor referencing another element, such as a button element, then the placeholder for the button element may need to be determined prior to determining the placeholder for logo element. If the button element further includes an anchor to another element, such as an image element, then the placeholder for the image element may need to be determined prior either of the placeholders for the button element or the logo element. Thus, a topological sorting is performed to sort the layout elements based on their anchor dependencies. A placeholder for each element of the sorted list of elements may be determined using the anchor manager 222. The anchor manager 222 outputs the placeholders for each element to a corresponding element renderer 224. The anchor manager 222 will be described in greater detail in reference to FIGS. 6-7C.

The element renderers 224 receive the placeholders for each corresponding element and determine an initial space allocation based on the placeholder and the flexibility of one or more anchors for each element. The element renderers 224 may include an image element renderer, a text element renderer, and a button element renderer. The initial space allocation is the space an element can occupy in the layout of the content item based on the placeholder and subject to the flexibility of one or more anchors of the element. In some implementations, an image analyzer 230 (shown in FIG. 4), may be used with an image element renderer 224 to determine salient portions of an image and/or perform smart cropping of an image to determine the initial space allocation. The element renderers 224 will be described in greater detail in reference to FIG. 8.

The space manager 226 receives the initial space allocations from the one or more element renderers 224 and determines a final space allocation for each element for the generated content item. The space manager 226 determines a final space allocation for each element having only fixed anchors based on the corresponding initial space allocation, determines a minimum space allocation for each element with one or more flexible anchors based on the corresponding initial space allocation, and modifies the space allocation of each element with one or more flexible anchors using a growth function to utilize any remaining space. The space manager 226 will be described in greater detail in reference to FIGS. 9-10B.

The conflict resolver 228 receives the final space allocations for the one or more elements of the content item and determines if any conflicts exist based on the final space allocations. Such conflicts may include overlap of elements, overflow of an element beyond the dimensions of the content item, insufficient margin, text truncation, and/or other content item template-specific conflicts. If a conflict exists, then the conflict resolver 228 may eliminate an element from the set of one or more elements and return the new set of elements to the anchor manager 222 to determine the placeholders based on the new set of elements. The element that is removed from the one or more elements may be based on the index values of the elements (e.g., removing the element with the highest index value indicative of the element being lower in importance to the content item template). In some implementations, if the element determined to be removed is indicated as a required element, then the conflict resolver 228 may send data to the layout parser 220 to parse a new content item template from the set of content item templates or the conflict resolver 228 may halt generation of the content item and output an error (e.g., if no other content item templates may be used). In some implementations, the conflict resolver 228 may receive one or more rules for the conflicts from a conflict system 232 (shown in FIG. 4). The conflict system 232 may include a margin definer to define a margin needed for each element based on the content item size. The conflict system 232 may further include conflict rules defining when text truncation may occur based on the content item size and/or other content item template-specific conflict rules.

Figure 4:
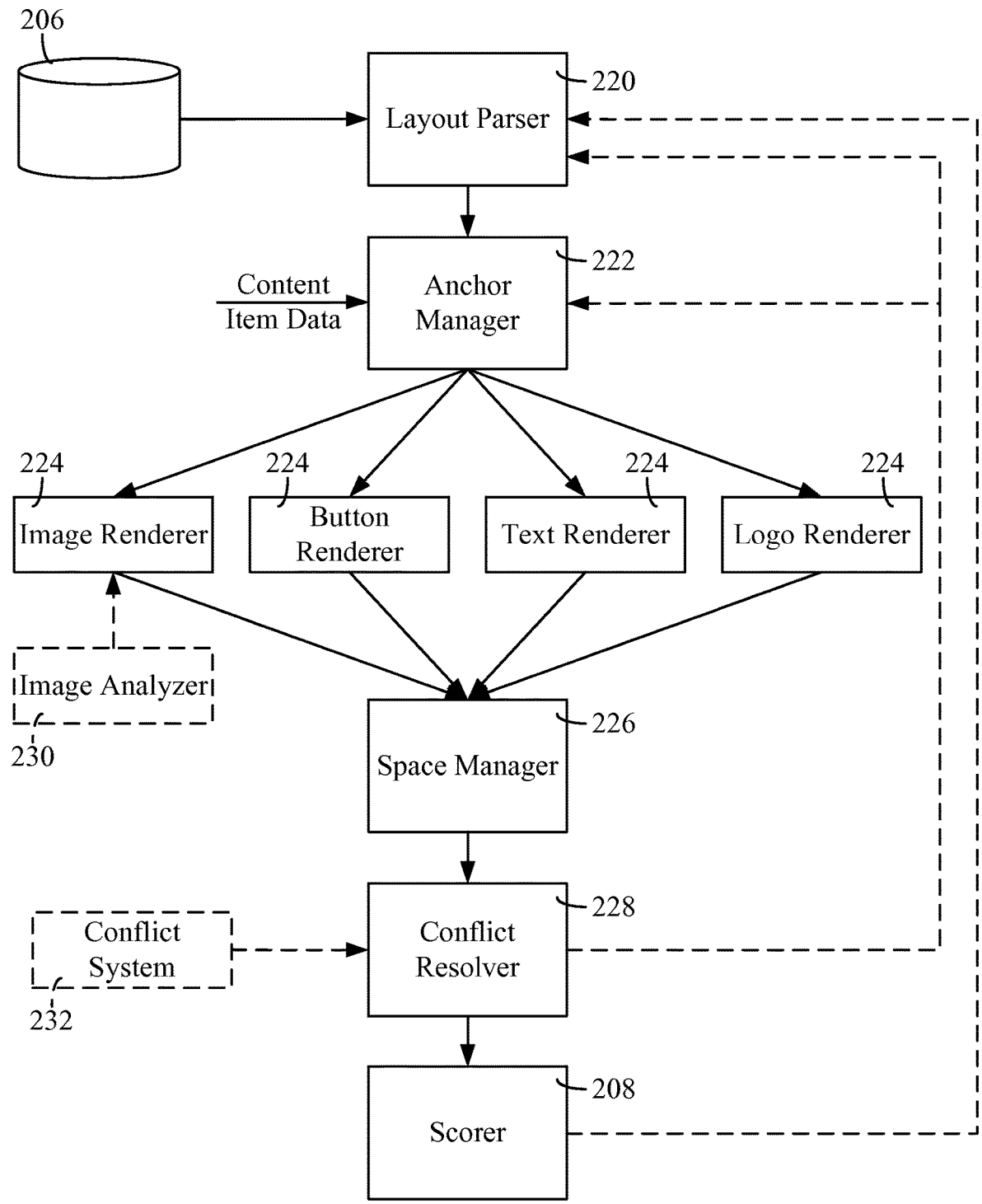
FIG. 4 is a block process diagram depicting an implementation of a process flow for the layout generator and scorer of FIG. 2.

FIG. 4 depicts an overview of a process diagram of an implementation of a process flow for the layout generator 200 and scorer 208 of FIG. 2. The details of the process flow will be described in greater detail in reference to FIGS. 5-11.

Figure 5:
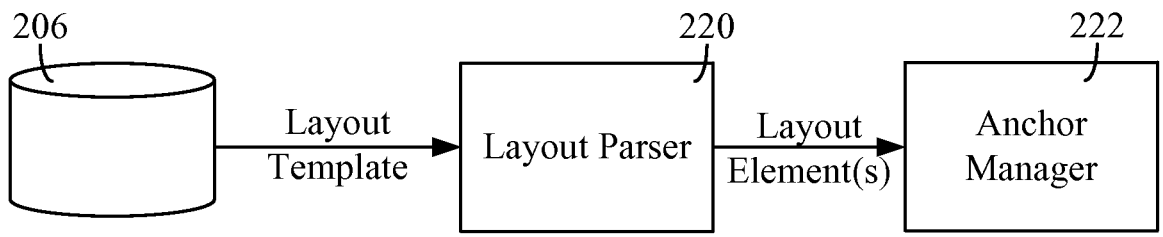
FIG. 5 is a block diagram depicting an implementation of the layout parser of FIGS. 3-4.

Referring the FIG. 5, the layout parser 220 receives a set of one or more layout templates from a content item template database 206. A content item template defines one or more elements and an arrangement of the one or more elements for a content item to be generated from the content item template. In some implementations, the one or more content item templates may be constrained XML configuration files that define one or more elements of a corresponding content item template. In other implementations, other mark-up languages may be used for the one or more content item templates. Each content item template includes at least one element that is a required element for the content item template. Furthermore, each element of the content item template includes an index value, an element name, and at least two anchors defining the arrangement of the element relative to another element and/or relative to the content item itself. The index value for each element may be used to prioritize elements of the content item template.

An implementation of a content item template XML configuration file for a banner-type content item may include elements for a product image element, a button element, a logo element, and a headline element. Such a content item template XML configuration file may be defined by the following:

```
Element name="productimage" index="1" required="true"
    anchor reference="contentitem" type="left" distance="0 px"
    anchor reference="contentitem" type="top" distance="0 px"
    anchor reference="contentitem" type="bottom" distance="0 px"
/Element
Element name="button" index="3"
    anchor reference="logo" type="right" distance="20 px"
    anchor reference="contentitem" type="bottom" distance="20 px"
/Element
Element name="logo" index="4"
    anchor reference="contentitem" type="right" distance="20 px"
```

-continued

```
    anchor reference="contentitem" type="bottom" distance="20 px"
/Element
Element name="headline" index="2"
    anchor reference="product" type="left" distance="10 px"
    anchor reference="logo" type="bottom" distance="10 px"
    anchor reference="contentitem" type="right" distance="10 px"
    anchor reference="contentitem" type="top" distance="10 px"
/Element
```

Figure 14A:
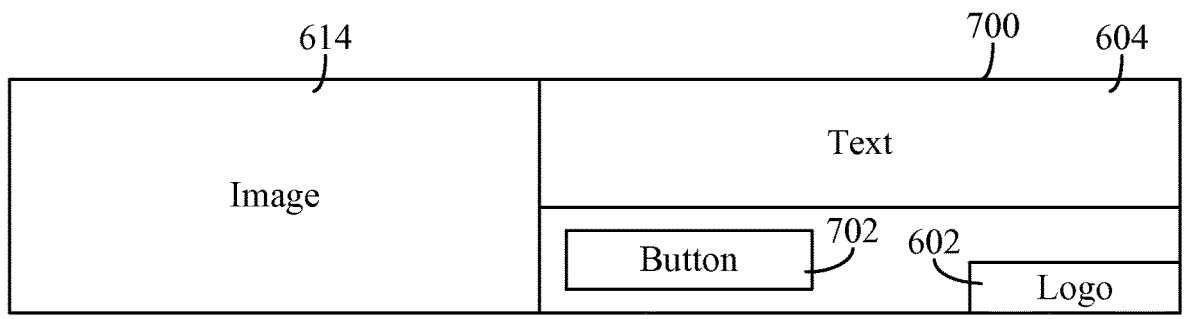
FIG. 14A is a block diagram depicting an implementation of a generated content item having first arbitrary dimensions and using a first content item template.
Figure 14B:
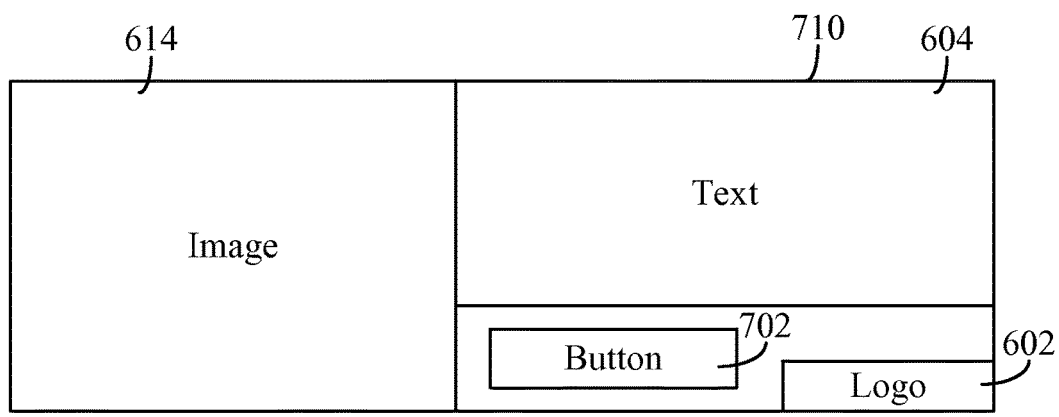
FIG. 14B is a block diagram depicting an implementation of another generated content item having second arbitrary dimensions and using the first content item template.

The content items 900, 920 shown in FIGS. 14A-14B may be generated based on the foregoing content item template XML configuration file. The layout parser 220 may receive the content item template XML configuration file and parse the file into four elements: the product image element, the button element, the logo element, and the headline element. The layout parser 220 may also parse the element names, index values, associated anchors, and/or whether the element is required. The layout parser 220 then sends a set of parsed layout elements and associated data to the anchor manager 222.

Figure 6:
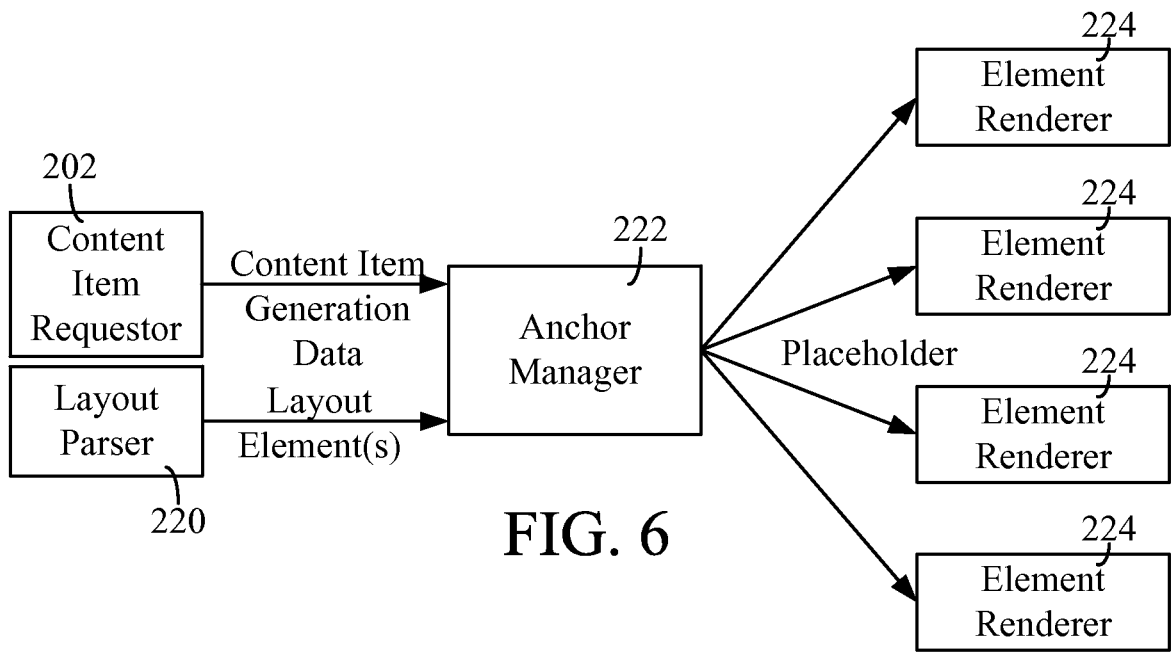
FIG. 6 is a block diagram depicting an implementation of the anchor manager of FIGS. 3-4.

Referring to FIG. 6, the anchor manager 222 receives the set of parsed layout elements and associated data, the first dimensional value and second dimensional value, and the content item data. The anchor manager 222 is configured to determine a placeholder for each of the one or more parsed layout elements based on the associated data for the one or more elements, the first dimensional value and the second dimensional value, and the content item data. The placeholder is the maximum space that an element can occupy in the content item. Because some elements may depend from other elements based on the anchors, the anchor manager 222 performs a topological sorting to determine an order in which to determine the placeholders for the one or more elements. That is, if an element, such as a logo element, includes an anchor referencing another element, such as a button element, then the placeholder for the button element may need to be determined prior to determining the placeholder for logo element. In some instances, the topological sorting may also utilize the index values to determine which placeholder to determine if two or more elements are not dependent upon other elements or depend on elements for which a placeholder has already been determined.

An anchor is used to describe a relationship between two elements of the content item template or between an element and the content item to be generated from the content item template. An anchor is defined by a reference (e.g., another element or the content item itself), a distance (e.g., a fixed distance, such as pixels (px), or a relative size of the reference, such as 10% of the size of the content item), a type (e.g., an edge of the element from which the distance to the reference is measured, such as top, bottom, left, or right), and a flexibility indicator (i.e., a value indicative of whether the position of the anchor is variable or fixed). In some implementations, if the flexibility indicator is omitted, then the anchor defaults to a fixed anchor. If an anchor is fixed, then the anchor cannot be modified even if the element overlaps another element, exceeds the dimensional size of the content item, etc. In such instances, the conflict resolver 228 will detect the conflict, as will be described in greater detail below in reference to FIG. 11. If the anchor is a flexible anchor, then that side of a space allocation for the element may vary in size. For instance, if a content item template includes two anchors (e.g., a left and right anchor) for a logo element that are both flexible, then, as will be discussed in greater detail later in reference to the space manager 226, the space manager 226 will increase the space allocation of the logo to fit the maximum width possible of a placeholder for the logo element. If the space manager 226 cannot increase the space allocation of the logo to the maximum width of the placeholder for the logo, then space manager 226 will fit the logo element in the center of the placeholder and return the extra space to buffer for other elements of the content item.

Figure 7A:
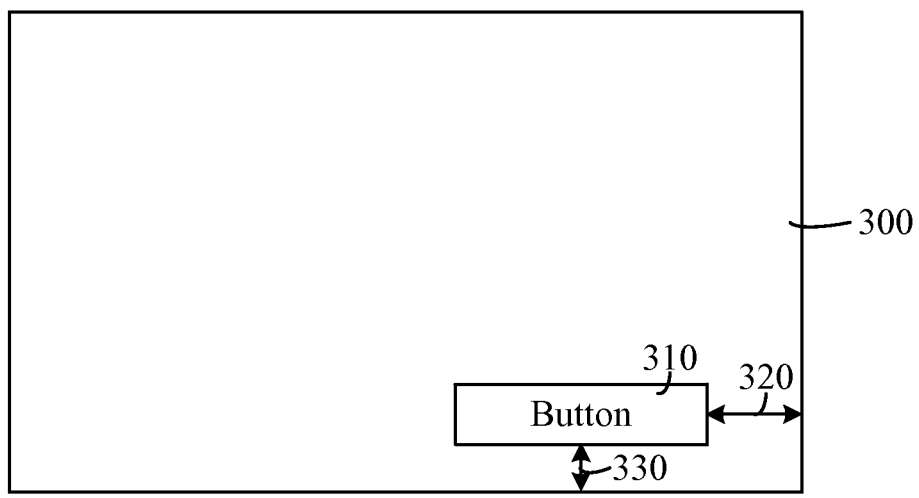
FIG. 7A is a diagram depicting an implementation of a content item layout with a button element defined by an anchor.
Figure 7B:
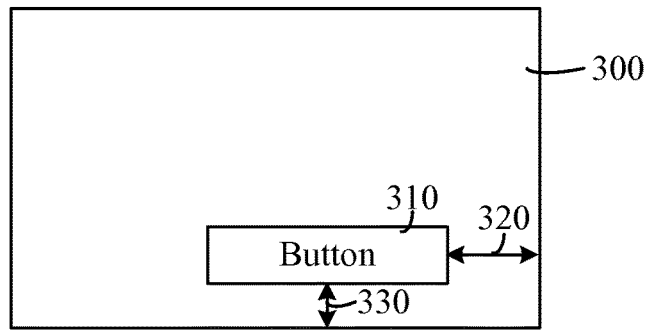
FIG. 7B is a diagram depicting the button element of FIG. 7A for a resized content item layout with a fixed pixel reference distance.
Figure 7C:
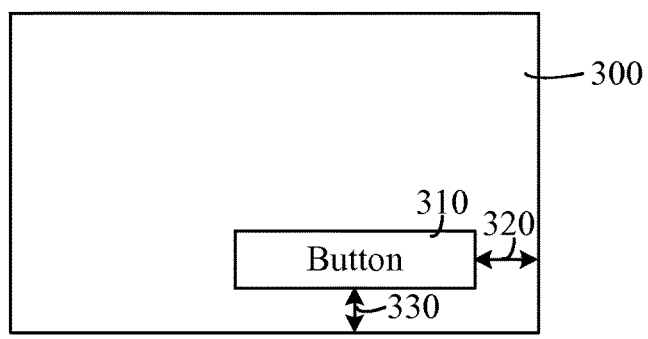
FIG. 7C is a diagram depicting the button element of FIG. 7A for a resized content item layout with a relative reference distance.

FIGS. 7A-7C depict an illustration of a content item 300 including a button element 310 that has an arrangement in the layout of the content item 300 defined by a first anchor and a second anchor. A representation of the first anchor 320 and a representation of the second anchor 330 are shown. If the first anchor is defined by:

anchor reference="contentitem" type="right" distance="10 px"

then the right side of the button element 310 is positioned 10 pixels from the right side of the content item 100. Referring to FIG. 7B, if the content item 300 is decreased in size, then the right side of the button element 310 remains 10 pixels from the right side of the content item 300 even if the content item size is changed. If the right anchor is instead defined by:

anchor reference="contentitem" type="right" distance="0.2"

then the right side of the button element 310 is positioned at a distance 20% of the size of the content item 300 from the right side of the content item 300. Referring to FIG. 7C, if the content item 300 is similarly decreased in size, then the distance of the right side of the button element 310 is similarly decreased from the right side of the content item 300 to maintain the 20% distance.

Referring back to FIG. 6 and to the implementation of a content item template XML configuration file for a banner-type content item above, the parsed product image element includes a name "productimage," an index value of 1, and a Boolean value indicating the product image element is required for the content item template. The parsed product image element arrangement for the content item template is defined by three anchors. A first anchor has a reference to the content item itself, has a type of left, and a distance of zero pixels. Thus, the left side of the product image element is "anchored" to the left side of the content item. Similarly, the second anchor has a reference to the content item itself, has a type of top, and a distance of zero pixels. Thus, the top side of the product image element is "anchored" to the top side of the content item. The third anchor has a reference to the content item itself, has a type of bottom, and a distance of zero pixels. Thus, the bottom side of the product image element is "anchored" to the bottom side of the content item. The product image element does not include a right side anchor, so the position of the right side of the product image element is dependent upon the image data from the content item data.

The parsed button element includes a name "button" and an index value of 3. The button element is not required as no Boolean value indicates that the button element is required. That is, if no value indicates that the element is required, then the element defaults to a non-required element. The button element arrangement for the content item template is defined by two anchors. A first anchor has a reference to the parsed logo element, has a type of right, and a distance of 20 pixels. Thus, the right side of the button element is "anchored" on the right side of the button element 20 pixels from the logo element. The second anchor has a reference to the content item itself, has a type of bottom, and a distance of 20 pixels. Thus, the bottom side of the button element is "anchored" on the bottom side of the button element 20 pixels from the bottom of the content item. The button element does not include a left side anchor or a top side anchor.

The parsed logo element includes a name "logo" and an index value of 4. The logo element is not required as no Boolean value indicates that the logo element is required. The logo element arrangement for the content item template is defined by two anchors. A first anchor has a reference to the content item itself, has a type of right, and a distance of 20 pixels. Thus, the right side of the logo element is "anchored" on the right side 20 pixels from the right side of the content item. Similarly, the second anchor has a reference to the content item itself, has a type of bottom, and a distance of 20 pixels. Thus, the bottom side of the logo element is "anchored" on the bottom side 20 pixels from the bottom side of the content item. The logo element does not include a left side anchor or a top side anchor.

The parsed headline element includes a name "headline" and an index value of 2. The headline element is not required as no Boolean value indicates that the headline element is required. The parsed headline element arrangement for the content item template is defined by four anchors. A first anchor has a reference to the product image element, has a type of left, and a distance of 10 pixels. Thus, the left side of the headline element is "anchored" on the left side 10 pixels from the left side of the product image element. The second anchor has a reference to the logo element, has a type of bottom, and a distance of 10 pixels. Thus, the bottom side of the headline element is "anchored" on the bottom side 10 pixels from the top side of the logo element. The third anchor has a reference to the content item itself, has a type of right, and a distance of 10 pixels. Thus, the right side of the headline element is "anchored" on the right side 10 pixels from the right side of the content item. The fourth anchor has a reference to the content item itself, has a type of top, and a distance of 10 pixels. Thus, the top side of the headline element is "anchored" on the top side 10 pixels from the top side of the content item.

Based on the dependency of the anchors, the topological sorting performed by the anchor manager 222 may determine that the product image element placeholder may be determined first based on the index value for the product image element. The logo element placeholder may be determined second based on the higher index value relative to the product image element index value. The headline element placeholder may be determined third based on the higher index value relative to the button element index value. Finally, the button element placeholder may be determined fourth.

The anchor manager 222 may determine the placeholders for each element based on the topological sorting. For a content item to be generated having a first dimensional value of 200 pixels wide and a second dimensional value of 200 pixels high and the image data for the product image element has dimensions of 100 pixels wide by 200 pixels high, then the anchor manager 222 can determine a placeholder for the product image element as {left:0, top:0, bottom:200, right: 100}. If the image data for the logo image element has dimensions of 30 pixels wide by 30 pixels high, then the anchor manager 222 can determine a placeholder for the logo image element as {left:150, top:150, bottom:180, right: 180}. The anchor manager 222 can determine a placeholder for the headline element as {left:110, top:10, bottom:140, right:190}. Finally, if a button for a 200 pixel by 200 pixel content item is a 30 pixel by 20 pixel button, then the anchor manager 222 can determine a placeholder for the button element as {left:130, top:160, bottom 180, right:130}. The anchor manager 222 sends the generated placeholders for each element to a corresponding element renderer 224.

Figure 8:
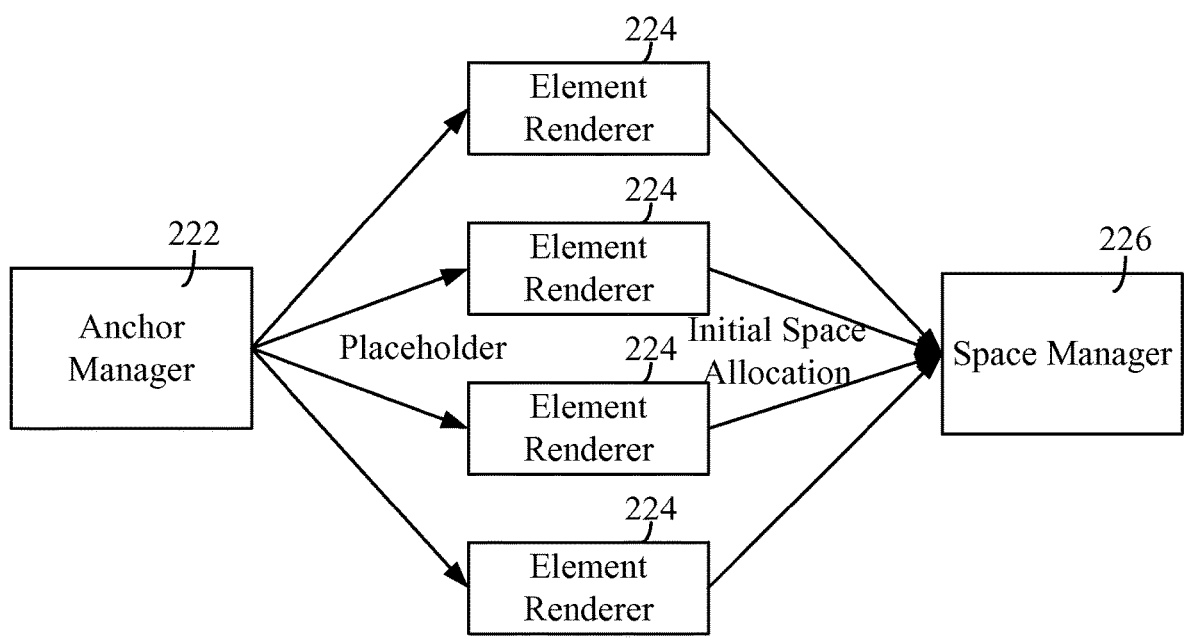
FIG. 8 is a block diagram depicting an implementation of the one or more element renderers of FIGS. 3-4.

Referring to FIG. 8, the element renderers 224 receive the placeholder for each corresponding element from the anchor manager 222 and determine an initial space allocation based on the placeholder and/or the flexibility of one or more anchors for each element. The element renderers 224 may include image element renderers, text element renderers, and button element renderers.

An image element renderer 224 may be allocated for each image element of a content item template. An image element renderer 224 determines an initial space allocation for a corresponding image element of the content item. If all anchors of the image element are fixed, then the image element renderer 224 will determine the initial space allocation is the same as the placeholder and an image for the image element will fill in the area of the initial space allocation.

If one or more anchors of the image element are flexible and one or more anchors are fixed, then the initial space allocation will be determined based on the original aspect ratio and size of an image for the image element. For instance, the image renderer 224 may limit the change in aspect ratio of the image to a predetermined range, such as 0.8, inclusive to 1.25, inclusive. For instance, if an image element has a placeholder of {left:0, top:0, bottom:200, right:100} and the right anchor is flexible, then the initial space allocation may be determined to be {left:0, top:0, bottom:200, right:[80, 125]}, where the width may be the range of 80 pixels, inclusive, to 125 pixels, inclusive. A final width value or location of the right side of the image element may subsequently be determined by the space manager 226 for a final space allocation.

If all the anchors of the image element are flexible, then the initial space allocation may include ranges for defining the position of the image element and the image is positioned in the center of the initial space allocation.

A text element renderer 224 may be allocated for each text element of a content item template. A text element renderer 224 determines an initial space allocation for a corresponding text element of the content item template. If all anchors of the text element are fixed, then the initial space allocation for the text element is the same as the corresponding placeholder for the text element. If one or more anchors of the text element are flexible, then the determined initial space allocation may include a range based on a minimum font size and a maximum font size. The minimum font size and the maximum font size may be based on the size of the content item to be generated.

A button element renderer 224 may be allocated for each button element of a content item template. A button element renderer 224 determines an initial space allocation for a corresponding button element of the content item template. In some implementations, the placeholder, initial space allocation, and final space allocation for a button may be the same predetermined size based on the first dimensional value and the second dimensional value (e.g., predetermined sizes for buttons may be used). In other implementations, if all anchors of the button element are fixed, then the initial space allocation for the button element is the same as the corresponding placeholder for the button element. If one or more anchors of the button element are flexible, then the flexible dimensions of the determined initial space allocation may be linearly scaled with the flexible dimensions of one or more of the other elements, such as an image element or a text element.

The initial space allocations for each element of the content item template may be sent to the space manager 226 to determine a final space allocation for content item to be generated.

Figure 9:
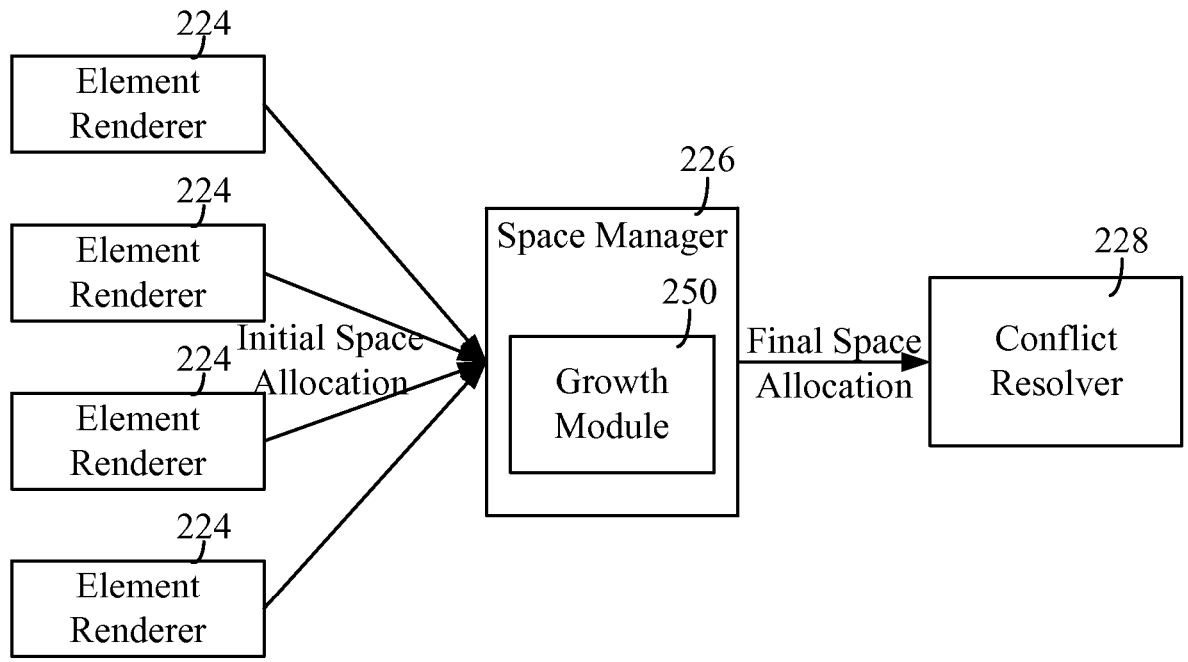
FIG. 9 is a block diagram depicting an implementation of the space manager of FIGS. 3-4 having a growth module.

Referring to FIG. 9, the space manager 226 receives the initial space allocations from the element renderers 224 to determine a final space allocation for each element. For each element having a fixed initial space allocation (e.g., {left:0, top:0, bottom:100, right:100} having no ranges), the space manager 226 determines a final space allocation as the same as the corresponding initial space allocation. For each element having a flexible anchor, the space manager 226 determines a minimum space allocation for each element based on the corresponding initial space allocation minimum range value or values and then modifies the space allocation of each element using a growth function of a growth module 250 to utilize any remaining space. That is, if all the elements fit for the minimal range value of the corresponding initial space allocation, then the space manager 226 uses a growth function of the growth module 250 for each element to increment a dimension of the space allocation of each element having a flexible anchor by one pixel each iteration until the dimensions of the space allocations cannot incremented further without overlapping another element. The growth function may increment each element in sequence based on an index value of the element and the type of element. That is, the growth function will increment the dimensions of an element with a flexible anchor having the lowest index value first, then the dimensions of an element having the next lowest index value, etc. until all elements having flexible anchors have been incremented. In some implementations, if the index values are equal, then the growth function may prioritize image elements over text elements and text elements over button elements. The growth function iterates through the elements having flexible anchors until the dimensions of the space allocations cannot incremented further without overlapping another element.

Figure 10A:
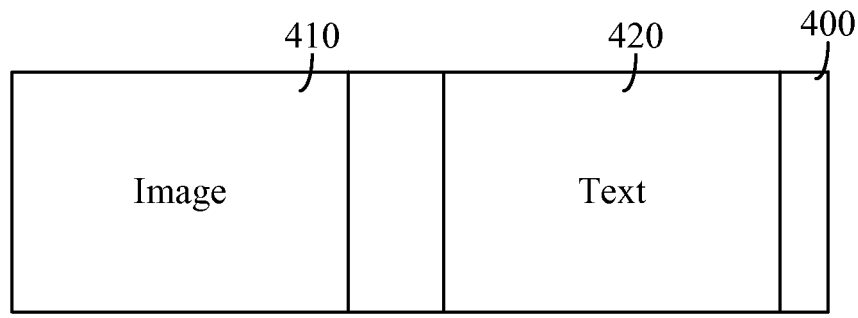
FIG. 10A is a diagram depicting an implementation of a content item having an initial minimum space allocation for an image element and an initial minimum space allocation for a text element.
Figure 10B:
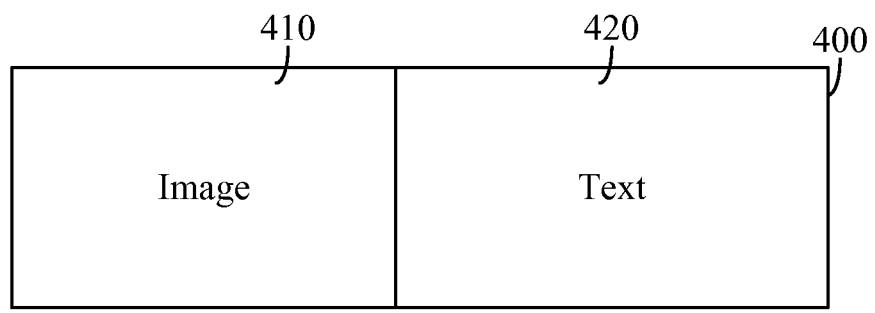
FIG. 10B is a diagram of the content item of FIG. 10A with a final space allocation for the image element and a final space allocation for the text element after applying a growth function of the growth module the space manager of FIG. 9.

FIGS. 10A-10B depict an application of the growth function of the growth module 250 for a content item 400 having two elements, an image element 410 and a text element 420. The image element 410 includes a flexible right anchor and the text element 420 includes a flexible left anchor and a flexible right anchor. For the content item 400 to be generated having a first dimensional value of 250 pixels wide and a second dimensional value of 100 pixels high, an initial space allocation determined for the image element 410 by an image element renderer 224 may be {left:0, top:0, bottom:100, right: [100,120]} and an initial space allocation determined for the text element 420 by a text element renderer 224 may be {left:[120-140], top:0, bottom:100, right:[230,250]}. FIG. 10A depicts the image element 410 positioned in the content item 400 for the minimal right range value of 100 from the corresponding initial space allocation determined by the image element renderer 224 and the text element 420 positioned in the content item 400 for the minimal left range value of 140 and the minimal right range value of 230 from the corresponding initial space allocation determined by the text element renderer 224. Applying the growth function of the growth module 250, the right range value of the image element may be incremented by one pixel to a value of 101, the left range value of the text element 420 may be incremented by one pixel to a value of 139, and the right range value of the text element 420 may be incremented by one pixel to a value of 231. The growth function may iterate through each single pixel increment until the final space allocation for the image element 410 is {left:0, top:0, bottom:100, right:120} and the final space allocation for the text element 420 is {left:120, top:0, bottom:100, right:250}, as shown in FIG. 10B.

Once the final space allocations for the one or more elements have been determined by the space manager 226, the final space allocations are sent to the conflict resolver 228.

Figure 11:
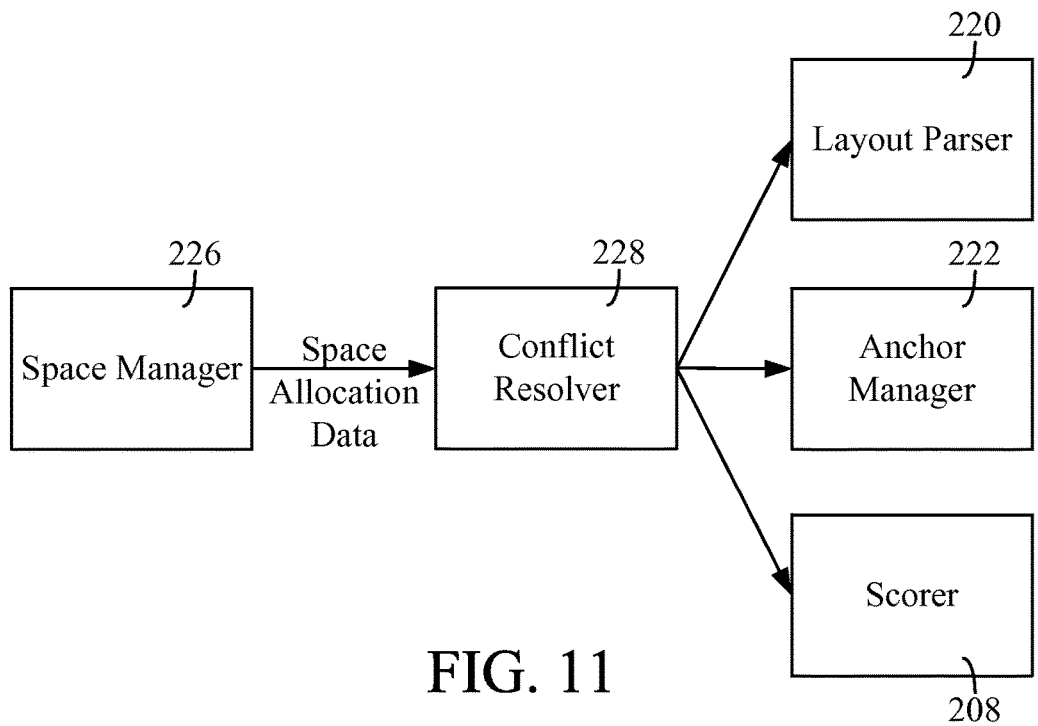
FIG. 11 is a block diagram depicting an implementation of the conflict resolver of FIGS. 3-4.

Referring to FIG. 11, the conflict resolver 228 receives the final space allocations and determines if any conflicts exist based on the final space allocations. Such conflicts may include overlap of elements, overflow of an element beyond the dimensions of the content item, insufficient margin, text truncation, and/or other content item template-specific conflicts. The conflict resolver 228 may compare the values of each final space allocation to determine whether a portion of the final space allocation of one element overlaps a portion of the final space allocation of another element. The conflict resolver 228 may compare the values of each final space allocation to the first dimensional value and the second dimensional value to determine whether a final space allocation exceeds a dimensional value of the content item to be generated such that the element overflows the dimensions of the content item. In some implementations, the conflict resolver 228 may add one or more margin values to the final space allocations and compare the final margin-increased space allocations to determine whether insufficient margin exists. In some instances, the conflict resolver 228 may receive a calculated margin value from a conflict system 232 (shown in FIG. 4) based on a content item size. In still further implementations, the conflict resolver 228 may determine whether one or more words in a text element is truncated. In still other implementations, the conflict resolver 228 may apply other content item template-specific rules received from the conflict system 232.

If a conflict exists, then the conflict resolver 228 may eliminate an element from the set of one or more elements and return a new, reduced set of elements to the anchor manager 222 to determine the placeholders based on the new set of elements. The element that is removed from the one or more elements may be based on the index values of the elements (e.g., removing the element with the highest index value indicative of the element being lower in importance to the content item template). In some implementations, if the element determined to be removed is indicated as a required element, then the conflict resolver 228 may send data to the layout parser 220 to parse a new content item template from the set of content item templates or the conflict resolver 228 may halt generation of the content item and output an error (e.g., if no other content item templates may be used).

If no conflict exists, then the conflict resolver 228 may pass the data for the content item and final space allocations to the scorer 208. The scorer 208 may determine a score for the content item based on the final space allocations. The score for the content item may be based on the number of elements in the generated content item compared to the number of elements of the content item template (e.g., if a content item template has 4 elements and the generated content item can only use 3 because of conflicts, the score may be decreased), the number of unused pixels (e.g., total pixels occupied by elements divided by the total pixels of the content item), an average number of unused pixels per vertical or horizontal line, and/or weightings for one or more elements (e.g., an eliminated image element may have a higher weighting, resulting in a lower score, than an eliminated text element with a lower weighting).

The process of layouts for content items and elements may be performed for several content item templates from a set of content item templates and a score for each generated content item layout may be determined. In some implementations, the content item generation system 120 may rank the scores and select the highest-scoring generated content item. In some implementations, the content item generation system 120 outputs data to display the selected highest-scoring generated content item to content item requestor 202 or to a content item database 210 to be stored.

Figure 12:
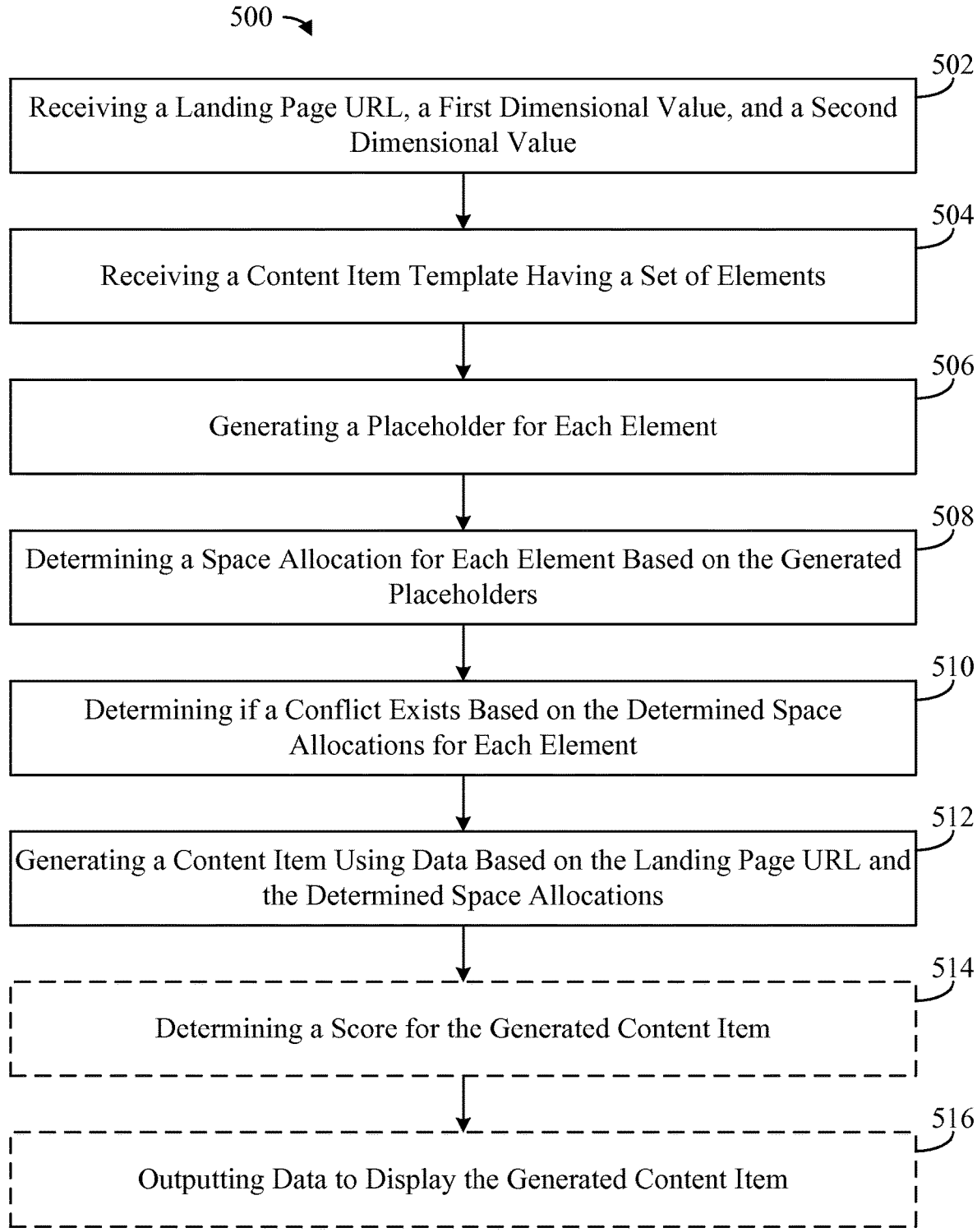
FIG. 12 is a flow diagram depicting an implementation of a process for generating a content item using the content item generation system of FIG. 2.

FIG. 12 depicts an implementation of a process 500 for generating a content item based on a landing page URL, a first dimensional value, and a second dimensional value implemented by the content item generation system 120. The process 500 includes receiving a landing page URL, a first dimensional value, and a second dimensional value (block 502). The landing page URL, first dimensional value, and second dimensional value may be received from a client device, a first-party content provider, or a third-party content provider. In some instances, the first dimensional value and second dimensional value may be received from a client device in response to the client device requesting a resource of the first-party content provider having a content item slot. In other implementations, the first dimensional value and second dimensional value may be received from the first-party content provider in response to a client device requesting a resource of the first-party content provider having a content item slot. In some implementations, the landing page URL, first dimensional value, and second dimensional value may be received from a third-party content provider independent of a client device requesting a resource. For instance, a third-party content provider may utilize a content item generation system to generate content items of different sizes to be stored in a database and served responsive to subsequent content item requests from a client devices or first-party content providers. Content item data may be determined from the landing page URL by a landing page analysis system.

The process 500 may further include receiving a content item template having a set of elements (block 504). A content item generation system may retrieve all of the content item templates from the content item template database as a set of content item templates or a subset of content item templates may be retrieved from the content item template database. In still further implementations, a selected content item template may be retrieved from the database o received from a third-party content provider.

The process 500 may further include generating a placeholder for each element (block 506). The generated placeholder for each element may be generated by an anchor manager based on the associated data for the one or more elements, such as anchors, the first dimensional value and second dimensional value, and the content item data.

The process 500 further includes determining a space allocation for each element based on the generated placeholders (block 508). In some implementations, an initial space allocation may be determined by an element renderer using a placeholder for each element and, in some instances, the flexibility of one or more anchors for each element. A final space allocation may be determined by a space manager. The final space allocation may include using a growth function to increment a dimension of a minimum initial space allocation for one or more elements having a flexible anchor.

The process 500 includes determining if a conflict exists based on the determined space allocations for each element (block 510). A conflict resolver may determine is an overlap conflict, an overflow conflict, an insufficient margin conflict, a text truncation conflict, and/or other content item template-specific conflicts exist. If a conflict exists, then the conflict resolver may eliminate an element from the set of one or more elements and return the new set of elements to the anchor manager to determine the placeholders based on the new set of elements. The element that is removed from the one or more elements may be based on the index values of the elements (e.g., removing the element with the highest index value indicative of the element being lower in importance to the content item template). In some implementations, if the element determined to be removed is indicated as a required element, then the conflict resolver may send data to the layout parser to parse a new content item template from the set of content item templates or the conflict resolver may halt generation of the content item and output an error (e.g., if no other content item templates may be used).

The process 500 further includes generating a content item using data based on the landing page URL and the determined space allocations responsive to determining no conflict exists (block 512).

In some implementations, the process 500 may further include determining a score for the generated content item (block 514). The score for the generated content item may be based on the number of elements in the generated content item compared to the number of elements of the content item template, the number of unused pixels, an average number of unused pixels per vertical or horizontal line, and/or weightings for one or more elements.

In some further implementations, the process 500 may still further include outputting data to display the generated content item (block 516). In some implementations, the data to display the generated content item may be transmitted to a client device responsive to a request from the client device. In other implementations, the data to display the generated content item may be outputted to a database to store the generated content item.

In some implementations, the time complexity of the process 500 may be $M*N^2$, where M is the number of content item templates and N is the number of elements.

Figure 13:
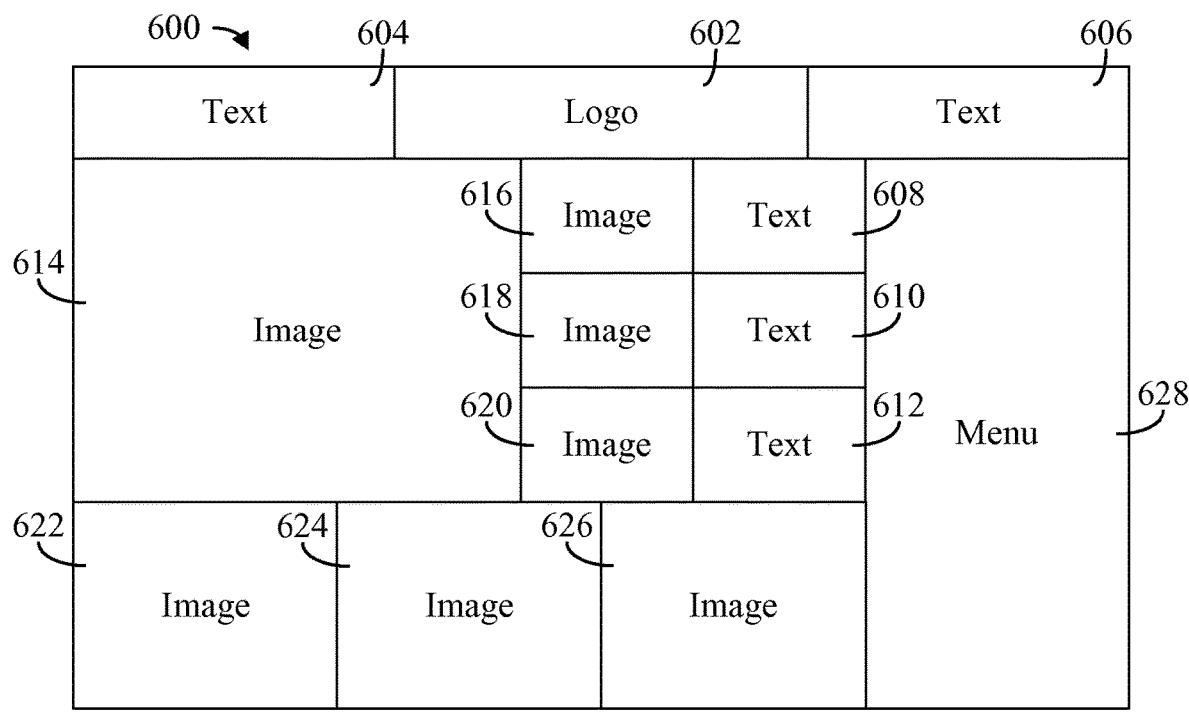
FIG. 13 is a block diagram depicting an implementation of a landing page resource associated with a landing page URL.

FIG. 13 depicts an example of a landing page resource 600 associated with a landing page URL. The landing page resource 600 includes a logo image 602, textual portions 604, 606, 608, 610, 612, images 614, 616, 618, 620, 622, 624, 626, and a menu portion 628. In some implementations, the landing page analysis system 204 may include a resource renderer capable of interpreting the landing page resource 600 associated with the landing page URL and creating a visual representation (e.g., an image, a display, etc.) thereof. The resource renderer may create a "snapshot image" of the landing page resource 600 associated with the landing page URL and/or construct a document object model (DOM) tree representing the various components of the landing page resource 600 associated with the landing page URL. In some implementations, the landing page analysis system 204 may extract content item data including the logo image 602, textual portion 604, and image 614.

Figure 15A:
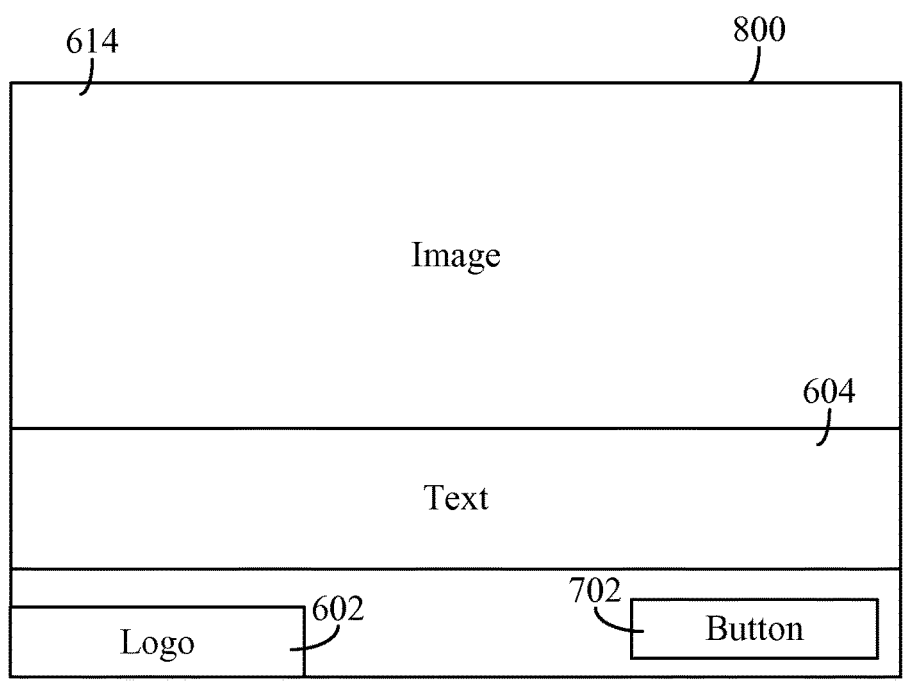
FIG. 15A is a block diagram depicting an implementation of a generated content item having third arbitrary dimensions and using a second content item template.
Figure 15B:
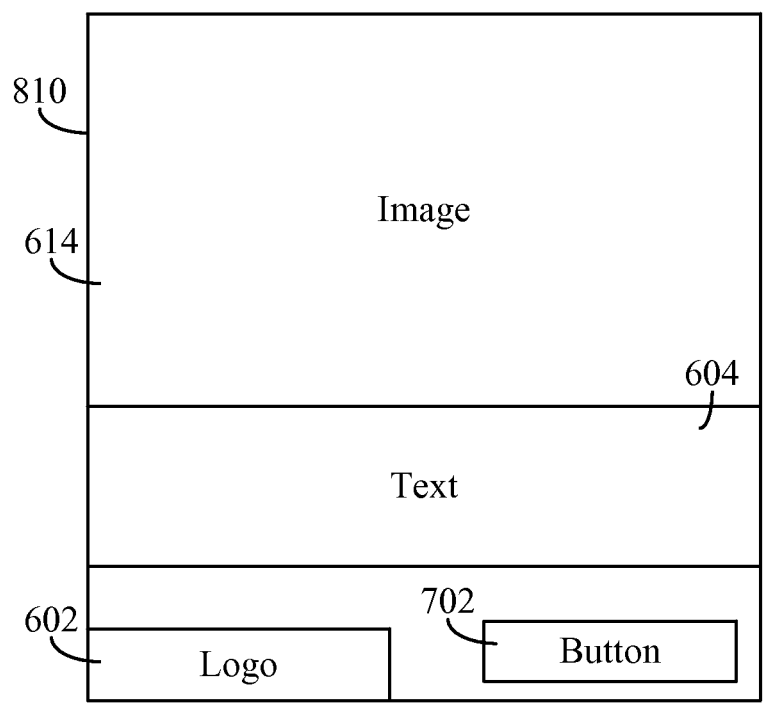
FIG. 15B is a block diagram depicting an implementation of another generated content item having fourth arbitrary dimensions and using the second content item template.

FIGS. 14A-15B depict implementations of generated content items using content item templates, arbitrary dimensional values for the first dimensional value and second dimensional value, and the extracted content item data from the landing page resource 600. FIG. 14A depicts a generated content item 700 having a first dimensional value of 680 pixels and a second dimensional value of 160 pixels and using a first content item template. The generated content item 700 includes the logo image 602, textual portion 604, image 614, and a button 702. FIG. 14B depicts a generated content item 710 having a first dimensional value of 580 pixels and a second dimensional value of 250 pixels and using the first content item template. The generated content item 710 includes the logo image 602, textual portion 604, image 614, and the button 702. FIG. 15A depicts a generated content item 800 having a first dimensional value of 380 pixels and a second dimensional value of 350 pixels and using a second content item template. The generated content item 800 includes the logo image 602, textual portion 604, image 614, and the button 702. FIG. 15B depicts a generated content item 810 having a first dimensional value of 280 pixels and a second dimensional value of 450 pixels and using the second content item template. The generated content item 810 includes the logo image 602, textual portion 604, image 614, and the button 702.

Figure 16:
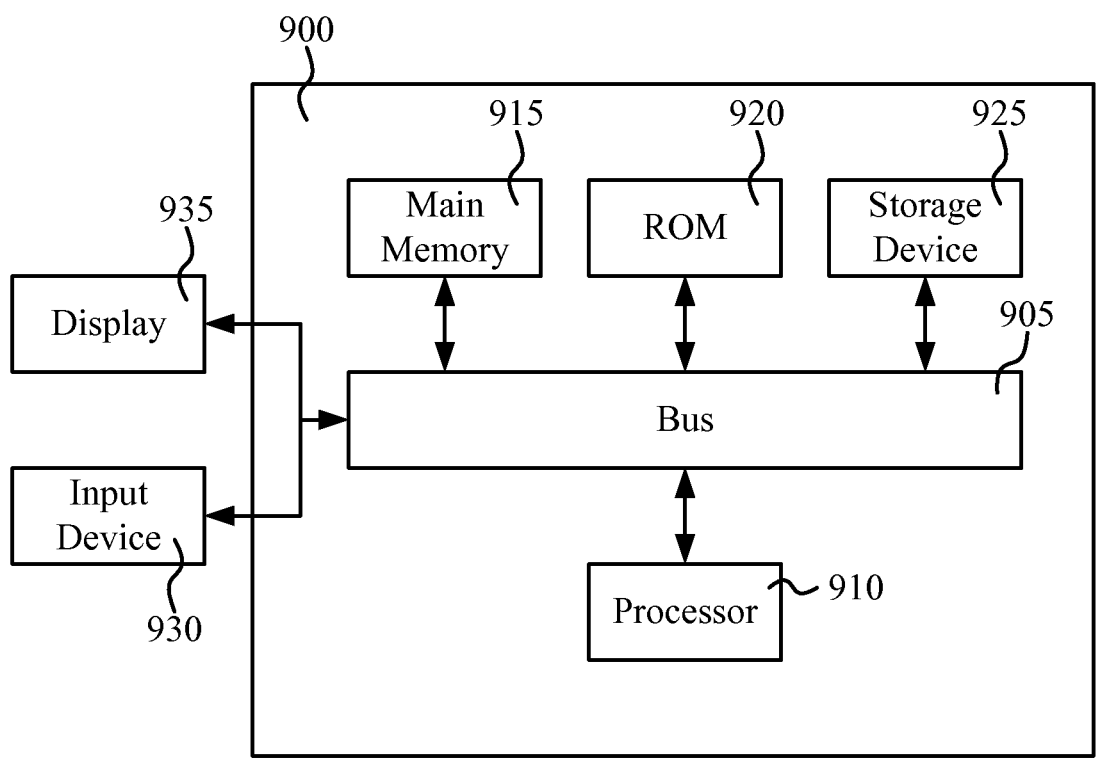
FIG. 16 is a block diagram depicting a general architecture for a computer system that may be employed to implement various elements of the systems and methods described and illustrated herein.

FIG. 16 is a block diagram of a computer system 900 that can be used to implement the client device 110, content item selection system 108, third-party content server 102, resource server 104, etc. The computing system 900 includes a bus 905 or other communication component for communicating information and a processor 910 coupled to the bus 905 for processing information. The computing system 900 can also include one or more processors 910 coupled to the bus for processing information. The computing system 900 also includes main memory 915, such as a RAM or other dynamic storage device, coupled to the bus 905 for storing information, and instructions to be executed by the processor 910. Main memory 915 can also be used for storing position information, temporary variables, or other intermediate information during execution of instructions by the processor 910. The computing system 900 may further include a ROM 920 or other static storage device coupled to the bus 905 for storing static information and instructions for the processor 910. A storage device 925, such as a solid state device, magnetic disk or optical disk, is coupled to the bus 905 for persistently storing information and instructions. Computing device 900 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 900 may be coupled via the bus 905 to a display 935, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 930, such as a keyboard including alphanumeric and other keys, may be coupled to the bus 905 for communicating information and command selections to the processor 910. In another implementation, the input device 930 may be integrated with the display 935, such as in a touch screen display. The input device 930 can include a cursor control, such as a mouse, a trackball, or cursor direction keys, for communicating direction information and command selections to the processor 910 and for controlling cursor movement on the display 935.

According to various implementations, the processes and/or methods described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes and/or method steps described herein. One or more processors in a multi-processing arrangement may also be employed to execute the instructions contained in main memory 915. In alternative implementations, hard-wired circuitry may be used in place of or in combination with software instructions to effect illustrative implementations. Thus, implementations are not limited to any specific combination of hardware circuitry and software.

Although an implementation of a computing system 900 has been described in reference to FIG. 16, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, for instance, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, for instance, semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for instance, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A system for automatically generating a content item for a content provider, the system comprising:
   one or more processors; and
   one or more storage devices storing instructions that, when executed by the one or more processors, cause the one or more processors to perform operations comprising:
      receiving a content item template having a set of elements for creating the content item;
      retrieving, using a uniform resource locator (URL) of a landing page of the content provider, content item data for the set of elements from the landing page, the content item data including at least text data and image data;
      generating a text description for the content item based on the content item data,
      generating a placeholder for each element of the set of elements of the content item template;
      selecting a space allocation for each element of the set of elements based, at least in part, on the generated placeholders for each element of the set of elements;
      determining whether a conflict exists based on determining whether a portion of a first space allocation of a first element of the set of elements overlaps a portion of a second space allocation of a second element of the set of elements;
      eliminating, when the conflict exists, an element from the set of elements and returning a new reduced set of elements to generate the placeholders based on the new reduced set of elements; and
      generating, when the conflict does not exist, the content item for the content provider using the content item data for the reduced set of elements, the generated text description, and the selected space allocations.

2. The system of claim 1, wherein each element of the set of elements of the content item template comprises an index and an anchor.

3. The system of claim 2, wherein the anchor comprises an anchor reference, an anchor type, and a distance between two elements of the content item template.

4. The system of claim 3, wherein the anchor type is a direction relative to the content item.

5. The system of claim 3, wherein the distance is a predetermined value or a relative value relative to the content item.

6. The system of claim 2, wherein the anchor comprises a flexibility indicator.

7. The system of claim 1, wherein an element of the set of elements of the content item template comprises a requirement indicator.

8. The system of claim 2, wherein generating the placeholder for each element of the set of elements comprises:
sorting the set of elements based on the index of each element of the set of elements.

9. The system of claim 2, wherein generating the placeholder for each element of the set of elements comprises:
determining a left value, a top value, a right value, and a bottom value for each element of the set of elements based, at least in part, on the anchor associated with each element.

10. The system of claim 1, wherein generating the content item comprises:
generating a snapshot image of a landing page resource; and
selecting one or more colors from the snapshot image for the content item.

11. The system of claim 10, wherein selecting the one or more colors from the snapshot image comprises extracting a plurality of color clusters from the snapshot image using a clustering technique.

12. The system of claim 11, wherein the clustering technique is a k-means clustering technique.

13. The system of claim 1, wherein selecting the space allocation for each element of the set of elements comprises:
determining an initial space allocation for an element of the set of elements based on a generated placeholder for the element;
determining a minimum space allocation for the element of the set of elements based on the initial space allocation; and
incrementing a dimension of the determined minimum space allocation for the element of the set of elements by a predetermined pixel value.

14. A computer-implemented method for automatically generating a content item for a content provider, the method comprising:
receiving a content item template having a set of elements for creating the content item;
retrieving, using a uniform resource locator (URL) of a landing page of the content provider, content item data for the set of elements from the landing page, the content item data including at least text data and image data;
generating a text description for the content item based on the content item data;
generating a placeholder for each element of the set of elements of the content item template;
selecting a space allocation for each element of the set of elements based, at least in part, on the generated placeholders for each element of the set of elements;
determining whether a conflict exists based on determining whether a portion of a first space allocation of a first element of the set of elements overlaps a portion of a second space allocation of a second element of the set of elements;
eliminating, when the conflict exists, an element from the set of elements and returning a new reduced set of elements to generate the placeholders based on the new reduced set of elements; and
generating, when the conflict does not exist, the content item for the content provider using the content item data for the reduced set of elements, the generated text description, and the selected space allocations.

15. The method of claim 14, wherein each element of the set of elements of the content item template comprises an index and an anchor.

16. The method of claim 15, wherein the anchor comprises an anchor reference, an anchor type, and a distance between two elements of the content item template.

17. The method of claim 16, wherein the anchor type is a direction relative to the content item.

18. The method of claim 16, wherein the distance is a predetermined value or a relative value relative to the content item.

19. The method of claim 15, wherein generating the placeholder for each element of the set of elements comprises:
determining a left value, a top value, a right value, and a bottom value for each element of the set of elements based, at least in part, on the anchor associated with each element.

20. The method of claim 14, wherein generating the content item comprises:
generating a snapshot image of the landing page resource; and
selecting one or more colors from the snapshot image for the content item.

21. The method of claim 20, wherein selecting the one or more colors from the snapshot image comprises extracting a plurality of color clusters from the snapshot image using a clustering technique.

22. The method of claim 21, wherein the clustering technique is a k-means clustering technique.

23. The method of claim 14, wherein the score is a first score and the generated content item is a first generated content item, the method further comprising:
determining a second score for a second generated content item based, at least in part, on second determined space allocations for each element of a second set of elements;
comparing the first score and the second score; and
selecting the first generated content item or the second generated content item based, at least in part, on the compared first score and second score.

24. The method of claim 14, wherein selecting the space allocation for each element of the set of elements comprises:
determining an initial space allocation for an element of the set of elements based on a generated placeholder for the element;
determining a minimum space allocation for the element of the set of elements based on the initial space allocation; and incrementing a dimension of the determined minimum space allocation for the element of the set of elements by a predetermined pixel value.

\* \* \* \* \*